(12) United States Patent
McManus et al.

(10) Patent No.: US 6,354,646 B1
(45) Date of Patent: Mar. 12, 2002

(54) LATCHING MECHANISM FOR LATCHING AND RELEASING A SLIDE-OUT ROOM

(75) Inventors: Patrick W. McManus, Osceola; Martin P. McManus; James E. Dewald, Jr., both of Mishawaka, all of IN (US)

(73) Assignee: VT Holdings II, Inc., Reno, NV (US)

( * ) Notice: Subject to any disclaimer, the term of this patent is extended or adjusted under 35 U.S.C. 154(b) by 0 days.

(21) Appl. No.: 09/715,485

(22) Filed: Nov. 17, 2000

Related U.S. Application Data

(60) Provisional application No. 60/166,332, filed on Nov. 19, 1999, provisional application No. 06/240,235, filed on Oct. 13, 2000, provisional application No. 60/074,235, filed on Feb. 11, 1998, provisional application No. 60/068,783, filed on Dec. 24, 1997, and provisional application No. 60/062,137, filed on Oct. 15, 1997.

(51) Int. Cl.[7] ................................................. B62C 1/06
(52) U.S. Cl. ............................... 296/26.13; 296/26.01; 296/26.12; 52/67
(58) Field of Search .............................. 296/23.13, 171, 296/175, 165, 26.09, 26.12, 173, 26.01; 52/67

(56) References Cited

U.S. PATENT DOCUMENTS

| | | | |
|---|---|---|---|
| 2,831,722 A | | 4/1958 | Hanson et al. |
| 2,913,775 A | | 11/1959 | Sailor |
| 4,049,310 A | | 9/1977 | Yoder |
| 4,930,837 A | * | 6/1990 | Marsh et al. ................ 296/165 |
| 5,050,927 A | | 9/1991 | Montanari |
| 5,560,444 A | | 10/1996 | Tiedge |
| 5,567,003 A | * | 10/1996 | Gill ............................ 296/173 |
| 5,577,351 A | * | 11/1996 | Dewald, Jr. et al. ............ 52/67 |
| 5,628,541 A | | 5/1997 | Gardner |
| 5,758,918 A | * | 6/1998 | Schneider et al. ............ 296/26 |
| 5,785,373 A | * | 7/1998 | Futrell et al. ............. 296/26.01 |
| 5,791,715 A | * | 8/1998 | Nebel .......................... 296/26 |
| 5,800,002 A | * | 9/1998 | Tiedge et al. ................. 296/26 |
| 5,829,822 A | * | 11/1998 | Tiedge ........................ 296/175 |
| 5,984,396 A | * | 11/1999 | Schneider ................ 296/26.13 |
| 6,048,016 A | * | 4/2000 | Futrell et al. ............ 296/26.12 |
| 6,094,870 A | * | 8/2000 | Stacy .......................... 296/26 |
| 6,224,126 B1 | * | 5/2001 | Martin et al. ............ 296/26.01 |
| 6,227,607 B1 | * | 5/2001 | Dewald, Jr. et al. ..... 296/26.13 |

* cited by examiner

*Primary Examiner*—Joseph D. Pape
*Assistant Examiner*—Kiran B. Patel
(74) *Attorney, Agent, or Firm*—Baker & Daniels

(57) ABSTRACT

A mobile living quarters unit incorporates a slide-out room which is moveable between an extended position providing an auxiliary living area when the unit is parked and a retracted position retracted into the unit when the unit is moved. A latching mechanism automatically latches the slide-out room to the mobile living quarters as the slide-out room is moved into the retracted position, and releases the room to permit outward movement of the slide-out room when the unit is parked and the slide-out room is extended.

52 Claims, 18 Drawing Sheets

LATCHING MECHANISM FOR LATCHING AND RELEASING A SLIDE-OUT ROOM

PRIORITY CLAIM

This application claims benefit of U.S. Provisional Application No. 60/166,332, filed Nov. 19, 1999, U.S. Provisional Application No. 60/240,235, filed Oct. 13, 2000, and U.S. Application 09/172,703, filed Oct. 14, 1998, now U.S. Pat. No. 6,227,607, which claims benefit of U.S. Provisional Application No. 60/074,325, filed Feb. 11, 1998, U.S. Provisional Application No. 60/068,783, filed Dec. 24, 1997, and U.S. Provisional Application No. 60/062,137, filed Oct. 15, 1997.

BACKGROUND OF THE INVENTION

1. Field of the Invention

This invention relates to a latching mechanism for latching a slide-out room of mobile living quarters (such as a recreational vehicle) to the main living area when the slide-out room is retracted into the main living area and releasing the room when the room is extended from the main living area.

2. Review of the Prior Art

The width of mobile living quarters, such as recreational vehicles, is limited to that which may be accommodated for travel on the highways. Accordingly, it has become commonplace to provide for so-called slide-out rooms which can be fully retracted into the vehicle for travel, and extended to enlarge the living area inside the vehicle when parked. For example, a common slide out area is in the living room area where a sofa abuts the back wall of the slide-out room. When the room is to be enlarged, the slide-out room together with the sofa projects outwardly to provide an enlarged floor space. Other manufacturers have other areas, such as a sleeping area, which can be enlarged by projecting an auxiliary slide-out room.

Slide-out rooms are normally supported and moved by driving mechanisms including telescoping tubes which are mounted on the frame supporting the main living area and are operated by hydraulic rams or electric motors. Sealing is provided to seal the slide-out room in both the retracted and extended positions, however, the slide-out room is only semi-rigid, and portions of the room farthest from the hydraulic rams or motors may not always engage the room with sufficient force (when in the retracted position) to ensure a satisfactory seal between the room and mobile living quarters. The driving mechanism can be adjusted so that the portion of the room closest to the mechanism (typically the bottom of the room) is drawn firmly against the seals when the room is retracted, but the portion of the room farthest from the rams (typically the top of the room) may deflect sufficiently that the seals are not engaged.

A variety of attempts have been made to rectify this situation. First, some manufacturers have created the slide-out room in a trapezoidal shape, as viewed from the side, such that the leading edge of the slide-out room is the top edge of the back wall. Others have attempted to "jack" the lower edge upwardly so as to cause a tilting of the room inwardly at the upper edge. These attempts have not eliminated the problem. Accordingly, it has become customary to use so-called "travel locks" to latch and maintain the upper edge of a slide-out room in a retracted position in firm engagement with the seals around the perimeter of the vehicle opening which receives the room. However, these travel locks must be engaged and disengaged manually.

Manual travel locks may be inconvenient to operate because they are generally positioned on the inside of the vehicle on the ceiling. People also forget about the locks, and attempt to move the room out to an extended position with the locks in place, causing damage to any of the locks, the room and the vehicle.

Most manufacturers provide slide-out rooms with a back wall having a peripherally extending lip that projects outwardly in all directions beyond the outer room dimensions such that when the room is in the fully retracted position, the lip is flush with the vehicle side wall. At least one sealing bead is typically provided which extends along the periphery of the lip and becomes compressed between the lip and vehicle side wall when the room is fully retracted. Thus, any latching mechanism which is devised should not violate the integrity of this seal during installation or operation.

The second sealing function is typically provided by a wiper seal which is located on the inwardly facing side and top edges of the room opening defined by the vehicle side wall. The wiper seal flexes against the slide-out room to remove water and debris from the room side walls and ceiling to prevent such water and debris from entering the main living area. This wiper seal also should not be violated or damaged in any way.

Also, since the upper edge of the slide-out room lip tends to tilt outwardly relative to the lower edge when the room is being retracted, a desirable latching mechanism should take into account that during the last several inches of inward travel, the lower edge may lead the upper edge. Thus, to ensure that the lower edge and upper edge firmly seal against the vehicle side wall, the upper edge must continue to travel inwardly after the lower edge has engaged the vehicle side wall. This factor is especially significant if an automatic system is devised which automatically latches the room into place in response only to the room movement, and draws the room firmly into engagement with the associated peripheral sealing.

Finally, as most manufacturers provide multitudes of different slide-out rooms with different sealing arrangements, and since thousands of recreational vehicles exist today with these same problems, it would be advantageous to provide a system which is retrofittable with existing systems.

SUMMARY OF THE INVENTION

The present invention provides a latching mechanism for a slide-out room that latches the slide-out room to the vehicle side wall so that the sealing around the periphery of the room is engaged with the vehicle side wall, thereby preventing entry of moisture or other environmental elements into the vehicle. The latching mechanism is responsive to relative movement between the slide-out room and the vehicle side wall to engage the latch as the slide-out room reaches the retracted position. The latching mechanism may also disengage the latch as the slide-out room begins to move away from the retracted position. In this way, the slide-out room may be automatically latched to the main living area when the slide-out room is retracted for travel and automatically unlatched as the room is extended for use.

These and other advantages of the present invention will become more apparent and the invention better understood by reference to the following description in conjunction with the accompanying drawings.

DETAILED DESCRIPTION OF EMBODIMENTS OF THE INVENTION

The embodiments of the invention described herein are not intended to be exhaustive or to limit the invention to the precise forms disclosed. Rather, the embodiments selected for description have been chosen to enable one skilled in the art to practice the invention.

Figure 1:
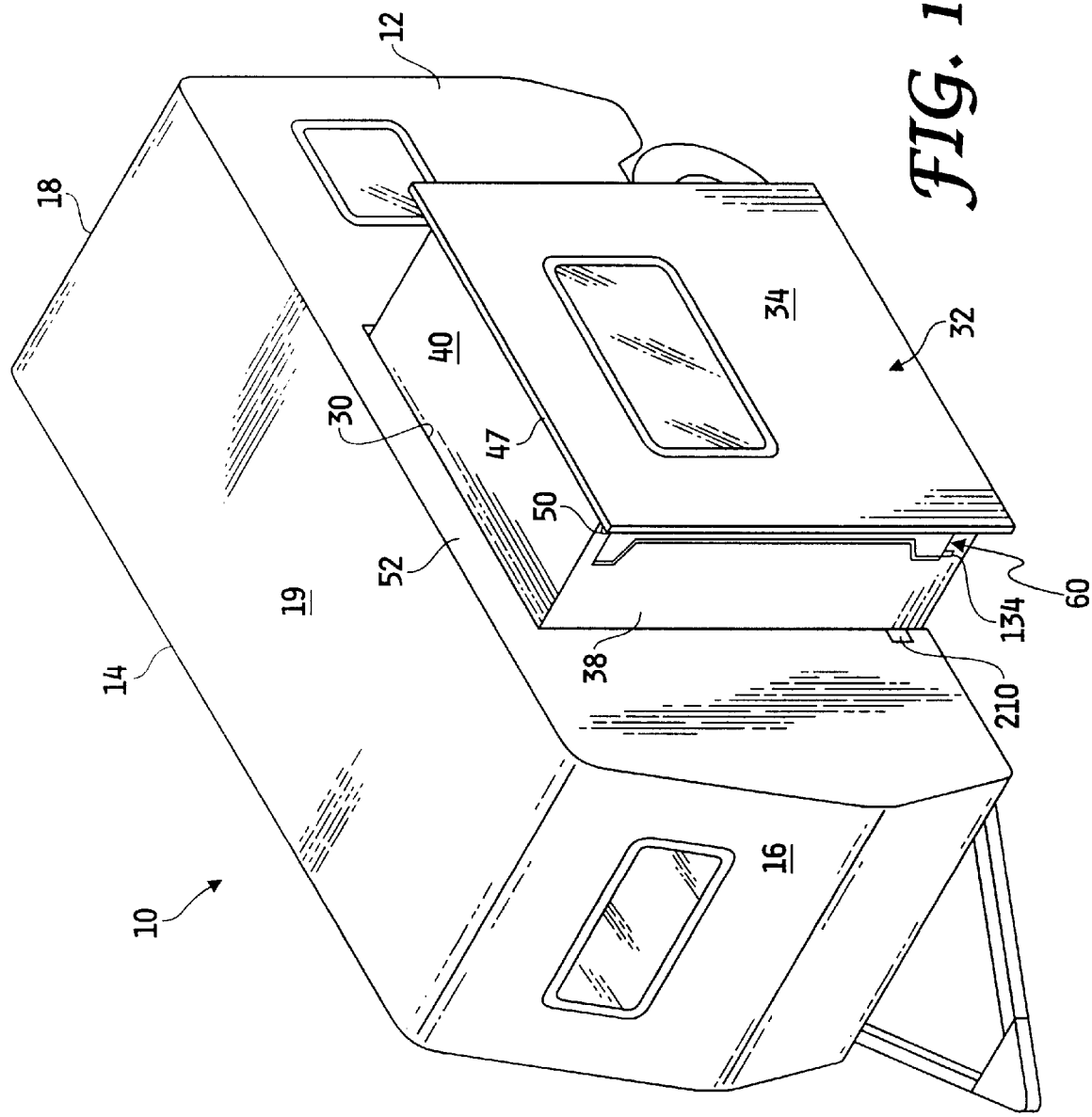
FIG. 1 is a perspective view of a recreational vehicle having a slide-out room shown in the extended position, with a latching mechanism according to the present invention.
Figure 2:
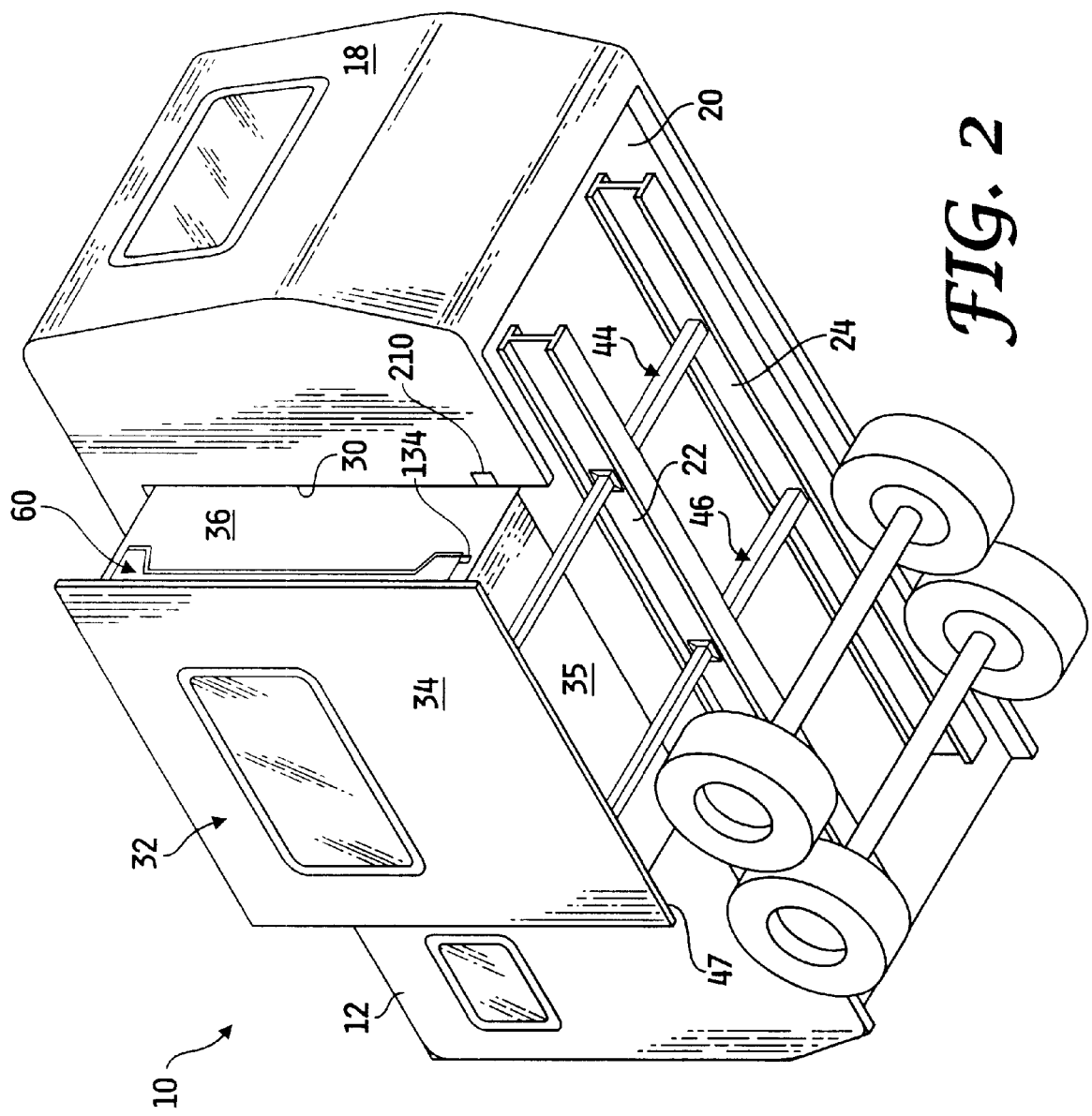
FIG. 2 is a perspective view similar to FIG. 1.

Referring now to the drawings, particularly FIGS. 1 and 2, a mobile living quarters unit generally indicated by the numeral 10 is defined by a pair of side walls 12 and 14, a pair of end walls 16 and 18, a ceiling or upper wall 19, and a floor 20. As shown in FIG. 2, mobile living quarters 10 is supported on longitudinally extending, transversely spaced frame members 22, 24. Side wall 12 is provided with an opening 30 for receiving a slide-out room generally indicated by the numeral 32 which can be extended from the mobile living quarters 10 to provide auxiliary living space when unit 10 is parked for use, but which may be retracted into unit 10 through opening 30 when the unit is to be moved.

Figure 3:
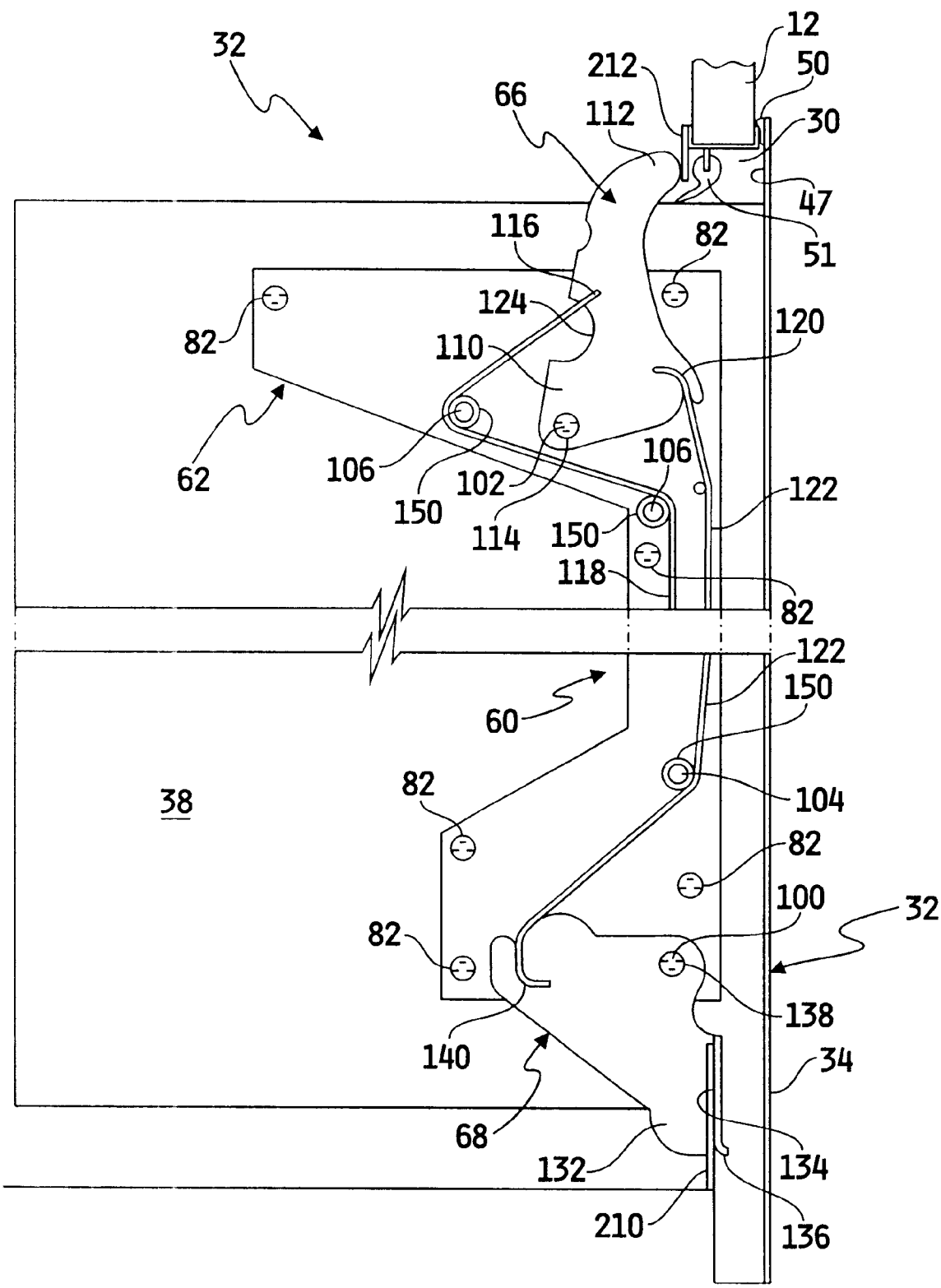
FIG. 3 is a fragmented, side elevational view of a latching mechanism of the present invention mounted to a slide-out room in the retracted position.
Figure 4:
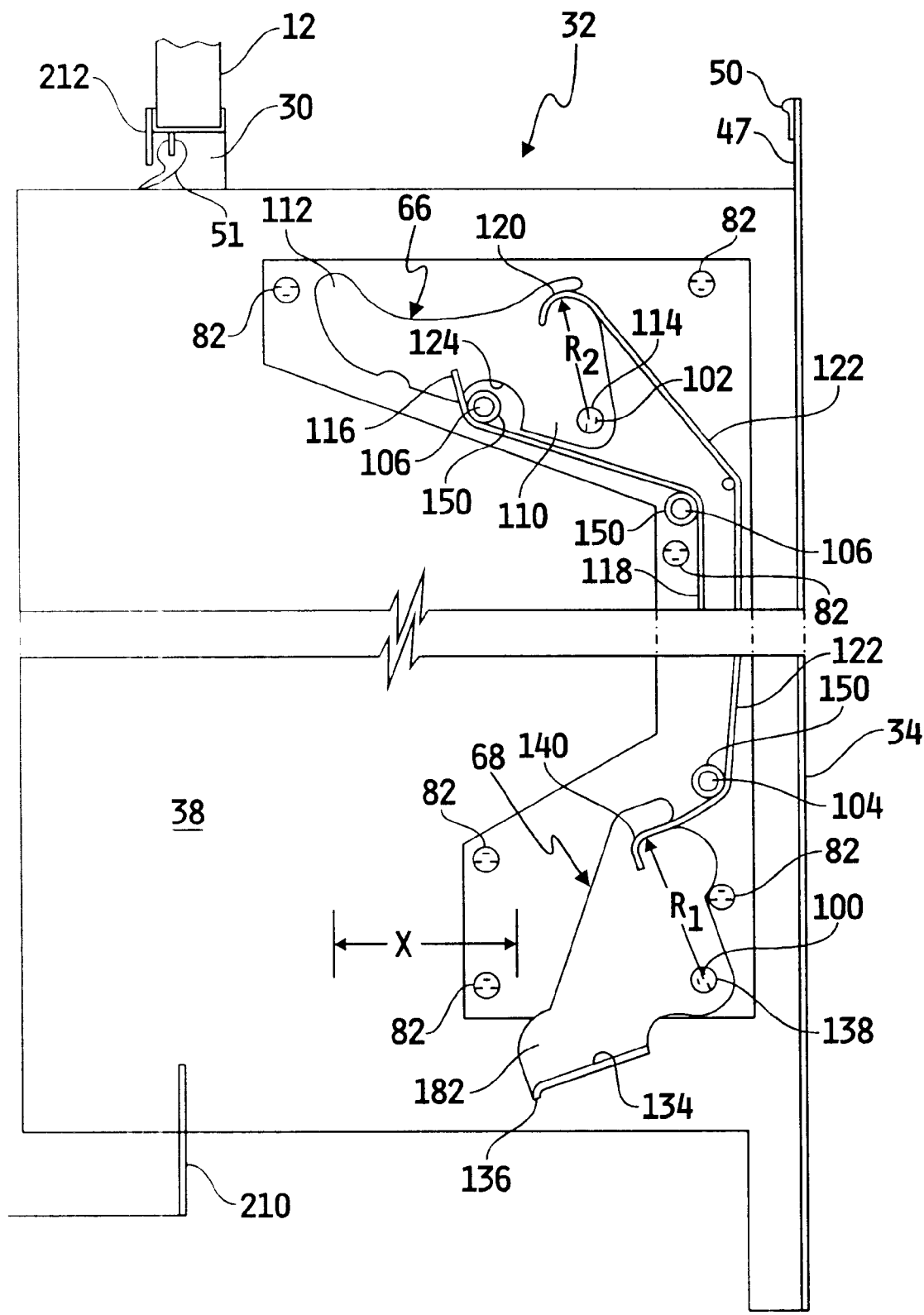
FIG. 4 is a view similar to that of FIG. 3 showing the slide-out room is in the extended position.

Slide-out room 32 includes a back wall 34, a ceiling 40, a floor 35 and a pair of opposite side walls 36, 38. Slide-out room 32 is supported for movement between the extended and retracted positions by driving mechanisms including telescoping support tubes generally indicated by the numerals 44, 46. A drive mechanism of conventional design is provided to move the slide-out room between the extended and retracted positions. Back wall 34 includes a lip portion or fascia 47 that projects beyond ceiling 40 and side walls 36, 38. A conventional seal 50 is compressed between fascia 47 and unit side wall 12, and a wiper seal 51 extends from the periphery of opening 30 (FIGS. 3 and 4). Seal 50 engages a corresponding sealing surface 52 on side wall 12 to effect a seal between side out room 32 and unit 10 when slide-out room 32 is moved into the retracted position. Wiper seal 51 wipes against the outside surfaces of side walls 36, 38 and ceiling 40 as room 32 is moved between the extended and retracted positions.

Since support tubes 44, 46 and the hydraulic rams (not shown) which power slide-out room 32 between the extended and retracted positions are attached to the lower portion of back wall 34, complete retraction of the lower portion of slide-outroom 32 can be assured. However, since slide-out room 32 cannot be made totally rigid, and because of inherent deflection of room 32, the portions of room 32 that are farther away from support tubes 44, 46 may not fully close against seal 50 and the sealing surface 52 of side wall 12, thereby permitting rain, snow, and other environmental elements to enter the living areas of unit 10.

According to the present invention, a latching mechanism or automatic travel lock is provided which is shown generally as 60, which automatically engages to ensure proper positioning of slide-out room 32 whenever slide-out room 32 is moved from the extended position to the retracted position in preparation for transporting. Latching mechanism 60 also automatically disengages to release room 32 when room 32 is moved from the retracted position to the extended position. As shown in FIGS. 1 and 2, a latching mechanism 60 is attached to both side walls 36 and 38, as will be further described below.

Figure 5:
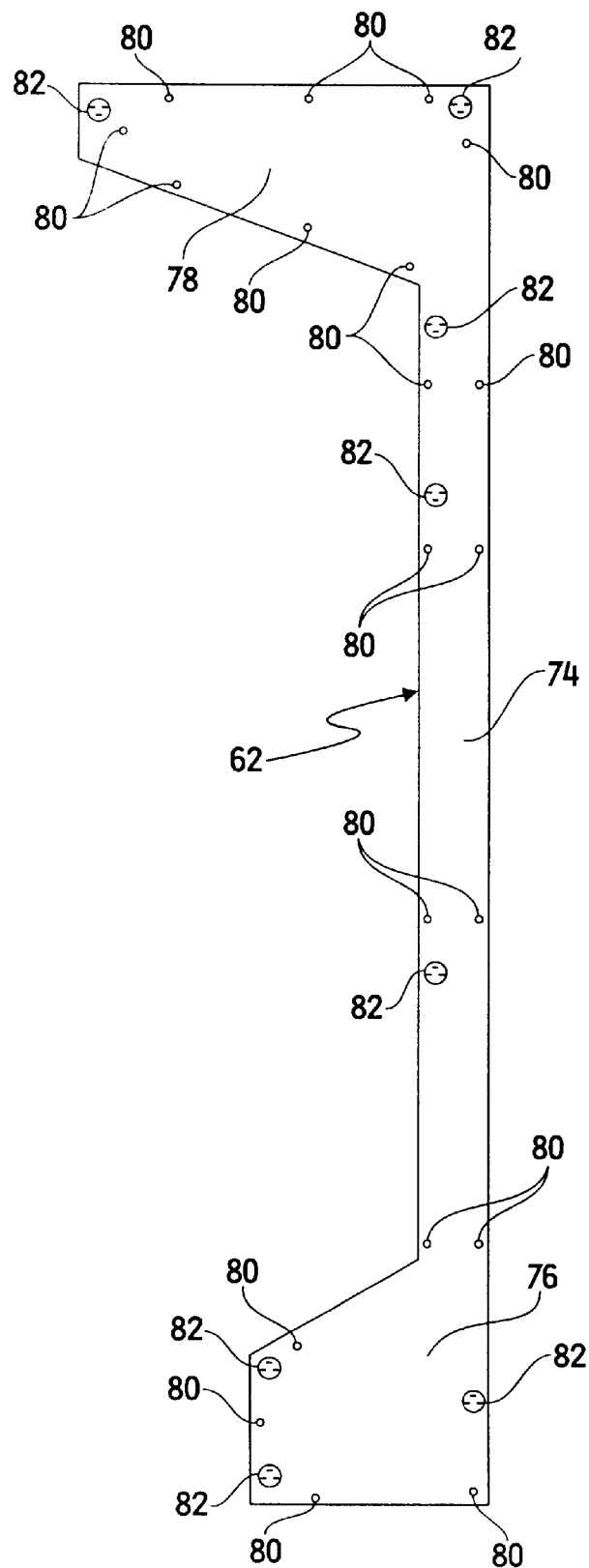
FIG. 5 is a side, elevational view of a mounting plate component of a latching mechanism.
Figure 6:
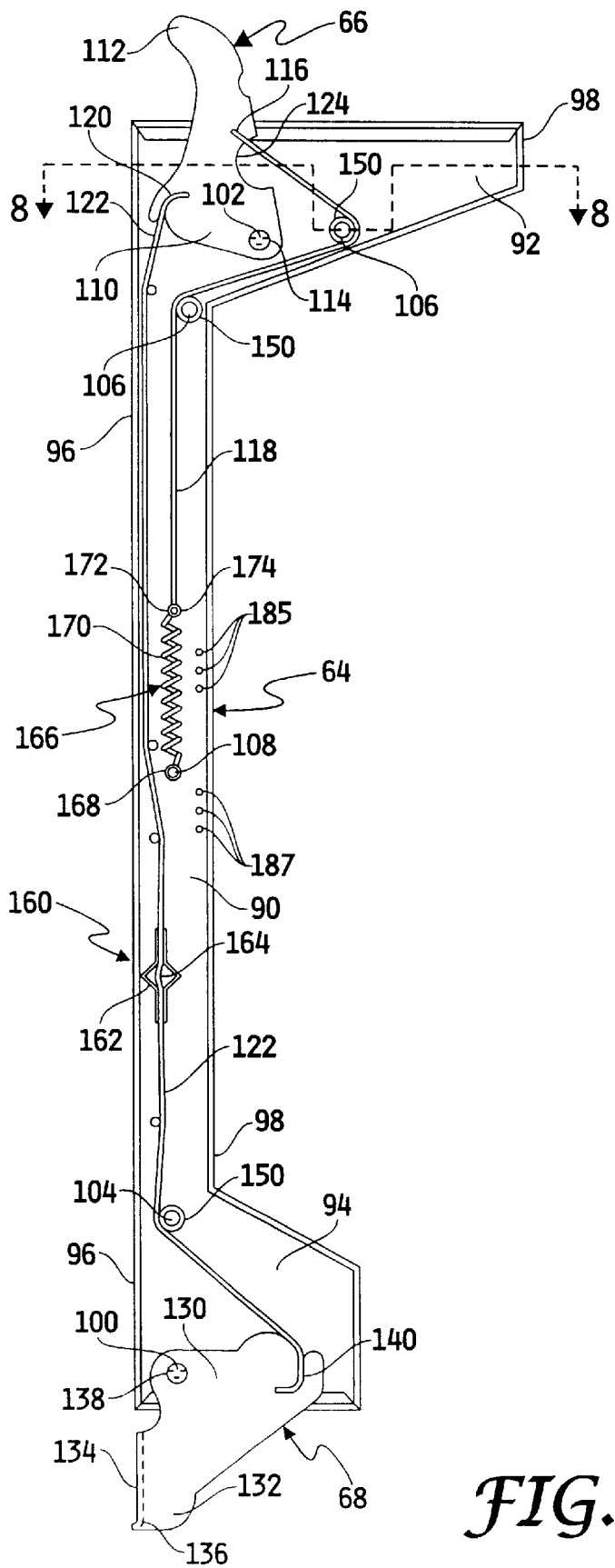
FIG. 6 is a side, elevational view of a cover plate and linkage in accordance with the invention.
Figure 7:
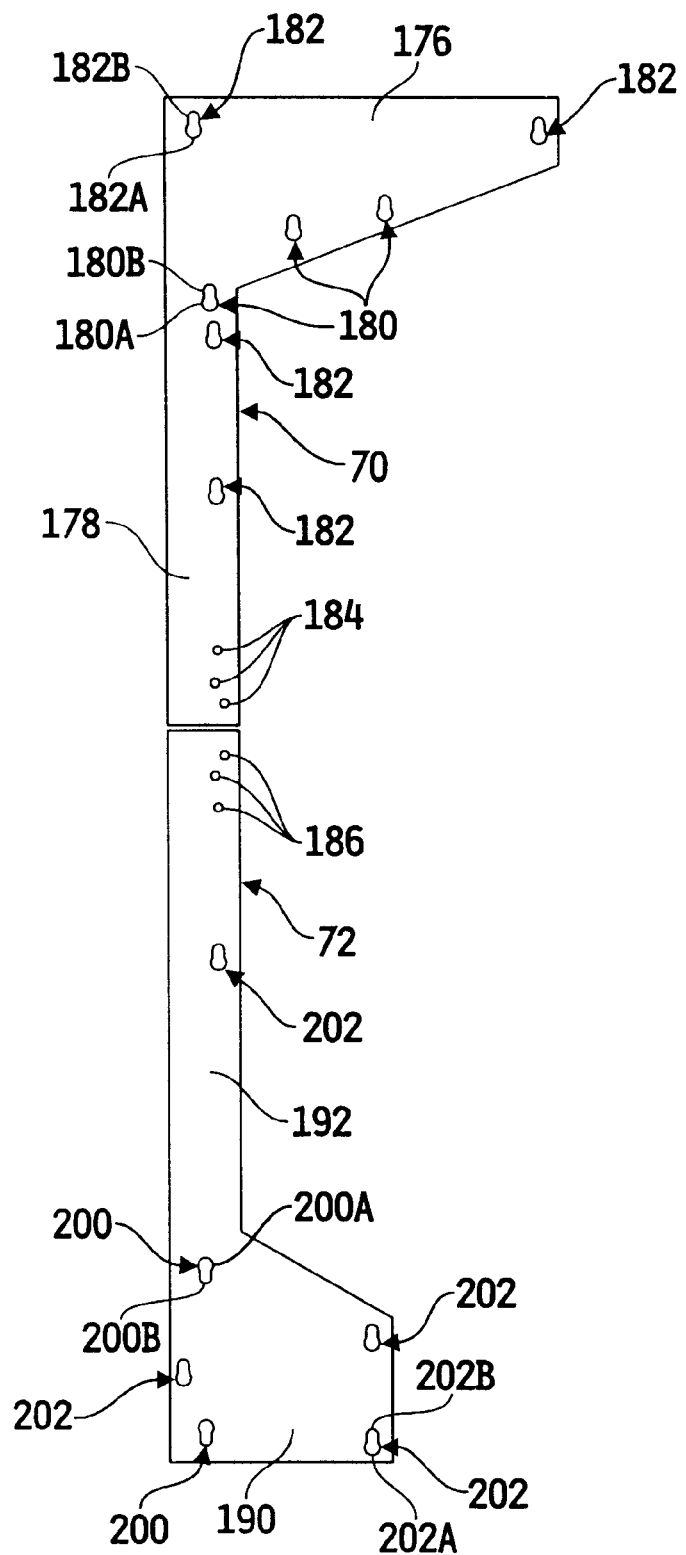
FIG. 7 is a side, elevational view of the retaining plates which retain the linkage within the cover plate, and retain the cover plate and linking on the mounting plate.

Latching mechanism 60 is mounted to each side wall 36, 38, and generally includes a mounting plate 62, best shown in FIG. 5, a cover plate 64, best shown in FIG. 6, a linkage including an upper linkage member 66 and a lower linkage member 68, and retaining plates 70 and 72, best shown in FIG. 7.

Referring now to FIG. 5, mounting plate 62 includes an elongate strip of metal 74, which in the preferred embodiment of the invention, is comprised of stainless steel or other metal having sufficient strength and non-corrosive characteristics. Each end of strip 74 has a foot portion 76 and 78. As will be further apparent from the discussion, foot portion 78 is the upper portion, whereas foot portion 76 is the lower portion. Mounting plate 62 is formed from a flat stamped and formed metal plate portion, which can either be unitary or comprised of multiple parts where a plurality of through holes 80 are positioned for mounting the plate 62 to one of side walls 36, 38 as will be described further herein. Mounting plate 62 also includes a plurality of mounting spools or pins 82, each including a cylindrical rod with a circumferential groove for receiving a snap ring.

Figure 8:
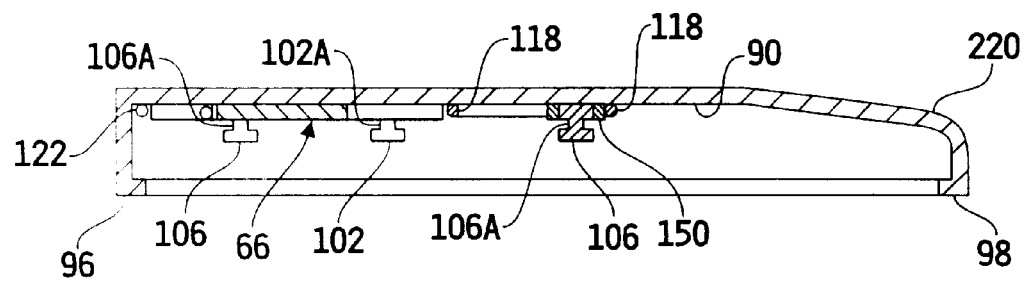
FIG. 8 is a cross-sectional view taken substantially along line 8—8 of FIG. 6.

Referring now to FIG. 6, cover plate 64 is also stamped and formed from a metallic sheet of metal such as a stainless steel, again to provide a corrosion-proof characteristic, and includes an elongate channel portion 90, an upper foot portion 92, and a lower foot portion 94. As best shown in FIGS. 6 and 8, cover plate 64 includes side margins 96 on the straight edge thereof, and side margins 98 along the opposite edge. These margins are formed in a folded over section so as to substantially form receiving channels therein as will be described in further detail. Cover plate 64 also includes a pivot pin 100 and an idler pin 104 connected to lower foot portion 94, and a pivot pin 102, and idler pins 106 connected to upper foot portion 92. A center idler pin 108 is connected to channel 90 of cover plate 64. It should be appreciated that each of idler pins 104, 106 includes a circumferential groove for locking purposes. For example, pins 102 and 106 shown in FIG. 8 have grooves 102a and 106a, respectively.

With respect again to FIG. 6, upper linkage member 66 includes an anchor portion 110 and a force transmitting portion 112. Anchor portion 110 includes an aperture 114 for receiving pivot pin 102. Upper linkage 66 further includes a slot 116 which receives a spring pressure cable 118, and an arcuate slot 120 which receives an interconnecting cable 122, as will be described further herein. A clearance slot 124 is also formed in upper linkage 66 which allows for rotation of upper linkage member 66 without interference with idler pin 106. Lower linkage member 68 includes an anchor portion 130, and an actuation portion 132 having a laterally extending flag portion 134. The end of flag portion 134 is a rounded contact section 136. Anchor portion 130 includes an aperture 138 for receiving pivot pin 100. Lower linkage member 68 further includes an arcuate slot 140 which receives the opposite end of cable 122. As will also be apparent from FIG. 6, a plurality of idler rollers 150 are positioned over idler pins 104, 106, as will be discussed herein. Finally, an overstress compensation link 160 is included intermediate cable 122 which includes a diamond-shaped spring 162 connected to cable 122, where cable 122 includes a kinked portion 164 within spring 162 for compensating an overstressed situation. A spring 166 is provided which includes a retaining ring 168 at one end, a plurality of coils 170, and a retaining ring 172 at the other end which cooperates with a locking ring 174 at the end of cable 118.

Referring now to FIG. 7, latching mechanism 60 further includes retaining plates 70 and 72 which are sized to be received within the receiving channels at side margins 96 and 98 so as to be trapped within channel 90. Retaining plates 70 and 72 are slidably received into cover plate 64 through an end adjacent upper foot portion 92 and an end adjacent lower foot portion 94, respectively. Plate 70 generally includes an upper foot portion 176 and a narrow portion 178. Plate 70 further includes a plurality of retaining apertures 180 and a plurality of mounting apertures 182. Apertures 180 include a circular portion 180a for receiving pins 102 and 106, and a slotted portion 180b which is received by circumferential grooves 102a, 106a (FIG. 8) of pins 102, 106, respectively, for retaining purposes. Apertures 182 also include circular portions 182a and slotted portions 182b. Finally, the end of retaining plate 70 opposite upper foot portion 176 includes a plurality of apertures 184 which are spaced to receive threaded bosses 185 which project from channel 90 of cover plate 64.

With respect still to FIG. 7, retaining plate 72 includes a lower foot portion 190 and a narrow portion 192. Retaining plate 72 is sized to fit within the receiving channels at side margins 98, 96 such that narrow portion 192 is positioned within channel 90 and lower foot portion 190 is positioned adjacent lower foot portion 94. Retaining plate 72 also includes retaining apertures 200, each having a circular portion 200a and a slotted portion 200b, and mounting apertures 202, each having a circular portion 202a and a slotted portion 202b. Apertures 200 and 202 operate in a manner similar to apertures 180 and 182 as described above. Plate 72 also includes apertures 186 adjacent the end of narrow portion 192 opposite lower foot portion 190. Apertures 186 are sized to receive threaded bosses 187 which project from channel 90 of cover plate 64.

Referring again to FIG. 6, upper and lower linkage members 66, 68 are connected to respective ends of cable 122. The ends of cable 122 are placed within slots 120, 140 of linkage members 66, 68, respectively, and are silver soldered in place. The silver soldering is then ground to be flush with the plane of linkage members 66, 68. Compensation link 160 is then added intermediate the ends of cable 122 by forming kinked portion 164 and silver soldering the diamond-shaped spring 162. Cable 118 is then silver soldered within slot 116 of upper linkage member 66 in the same manner as cable 122. The end of cable 118 is also ground such that the silver solder is made flush with the plane of the plate forming upper linkage member 66.

Cover plate 64 is then assembled by first placing idler rollers 150 onto the respective idler pins 104, 106, and by placing upper and lower linkage members 66, 68 onto the respective pivot pins 100, 102. As mentioned previously, aperture 138 in lower linkage member 68 fits onto pivot pin 100, whereas aperture 114 of upper linkage member 66 fits onto pivot pin 102. It should also be appreciated that linkage members 66, 68 and pivot pins 100, 102 are profiled such that circumferential grooves 100a, 102a of pivot pins 100, 102 extend above the plane of linkage members 66, 68 as shown in FIG. 8. Cable 122 is positioned behind the idler roller 150 of idler pin 104 and within channel 90. Cable 118 is similarly laced around the idler rollers 150 of idler pins 106, and spring 166 is positioned in place by placing retaining ring 168 onto center idler pin 108. Retaining ring 172 is then connected to locking ring 174. It should be appreciated that cable 118, when connected to spring 166, holds upper linkage member 66 within upper foot portion 92 of cover plate 64. This, through cable 122, also causes full rotation of lower linkage member 68, placing substantially all of linkage member 68 within cover plate 94. Flag portion 134 extends from cover plate 94.

With these components assembled as discussed above, retaining plates 70, 72 can be positioned into the receiving channels at side margins 96, 98 such that narrow portion 178 of retaining plate 70 is received within channel 90 of cover plate 64, and retaining apertures 180 are locked onto pivot pin 102 and idler pins 106. When retaining plate 70 is fully inserted into cover plate 64, slotted portions 180b are positioned within circumferential grooves 102a, 106a of pins 102, 106, respectively. Also, apertures 184 register with threaded bosses 185 extending from channel 90 such that fasteners (not shown) can be threaded into bosses 185 to hold retaining plate 70 in place. Retaining plate 72 is similarly positioned within the receiving channels at side margins 96, 98 from the other end of cover plate 64. When so positioned, retaining apertures 200 receive and lock onto pivot pin 100 and idler pin 104 in a manner similar to that described above. Likewise, apertures 186 receives threaded bosses 187 which receive fasteners (not shown) to hold retaining plate 72 in place.

With the assembly as described above, the mounting of latching mechanism 60 to slideout room 32 will now be described. With reference first to FIG. 5, a mounting plate 62 is mounted to each of side walls 36, 38, which are formed of composite wood or fiber glass (FIGS. 1 and 2) by inserting fasteners (not shown) through holes 80 into side walls 36, 38. It should be appreciated that the mounting plates 62 are mirror images of each other, and only one such plate is described to simplify this description. Plate 62 is mounted to side wall 38 such that the foot portion 78 is adjacent the top edge of slide-out room 32. After mounting plate 62 is installed, cover plate 64, together with linkage members 66, 68 and retaining plates 70, 72, can be attached to mounting plate 62.

Specifically, mounting apertures 182, 202 of retaining plates 70, 72, respectively, are aligned with the plurality of slotted pins 82 extending from mounting plate 62. It should be appreciated that mounting apertures 182, 202 are sized such that circular portions 182a, 202a, respectively, fit over pins 82 while the circumferential grooves around pins 82 slidably receive slotted portions 182b, 202b of mounting apertures 182, 202. After cover plate 64 and retaining plates 70, 72 are attached to mounting plate 62 as described above, latching mechanism 60 is fixed to side wall 38 by a fastener through the entire assembly into side wall 38.

Additionally, a strike plate 210 is attached to side wall 12 as shown in FIG. 1 such that flag portion 134 of lower linkage member 68 will contact strike plate 210. In a like manner, a strike plate 212 is located on the interior of unit 10 (FIGS. 3 and 4) such that force transmitting portion 112 of upper linkage member 66 contacts strike plate 212 during operation. Latching mechanism 60 is mounted on side wall 38 so that contact section 136 of lower linkage member 68 is spaced approximately 1' from fascia 47.

With reference now to FIGS. 3 and 4, the operation of latching mechanism 60 will be described in greater detail. As shown in FIG. 4, when room 32 is in the extended position, the force applied by spring 166 through cable 118 urges upper linkage member 66 into a downward, full counter-clockwise position, as viewed in FIG. 4. Lower linkage member 68 is also retracted substantially within cover plate 64 by cable 122, in its full clockwise position as shown in FIG. 4. It should be appreciated that as slide-out room 32 is moved toward the retracted position of FIG. 3, contact section 136 of laterally extending flag portion 134 contacts strike plate 210 and pivots lower linkage member 68 in a counter-clockwise direction about pivot pin 100 as viewed in FIGS. 3 and 4. This pivotal movement of lower linkage member 68 is transferred by cable 122 and causes clockwise pivotal movement of upper linkage member 66. As shown in FIG. 4, force transmitting portion 112 of upper linkage member 66 leads contact section 136 by a distance x which is sufficient to position force transmitting portion 112 through wiper seal 51 prior to its rotation upward. As should be apparent from the foregoing, upper linkage member 66 must be inside unit 10 prior to its actuation and rotation, so that upper linkage member 66 does not rotate upward and collide with sealing surface 52 of side wall 12. In the preferred embodiment of the invention, x is approximately six inches.

As slide-out room 32 is further moved toward the retracted position, laterally extending flag portion 134 becomes flush or nearly flush against strike plate 210 and upper linkage member 66 rotates upwardly to the position shown in FIG. 3 to contact its strike plate 212. It should be appreciated from FIG. 4 that the rotation of the upper linkage member 66 relative to the movement of lower linkage member 68 will be largely dependent upon the pivot radii $R_1$ relative to $R_2$. It should be appreciated from a comparison of FIGS. 3 and 4, that the angle of rotation of upper linkage member 66 must be greater than the angle of rotation of lower linkage member 68, and therefore radius $R_1$ is greater than radius $R_2$. This geometry defines an amplification link as it relates to the rotation of upper linkage member 66 upwardly into contact with strike plate 202.

Figure 9:
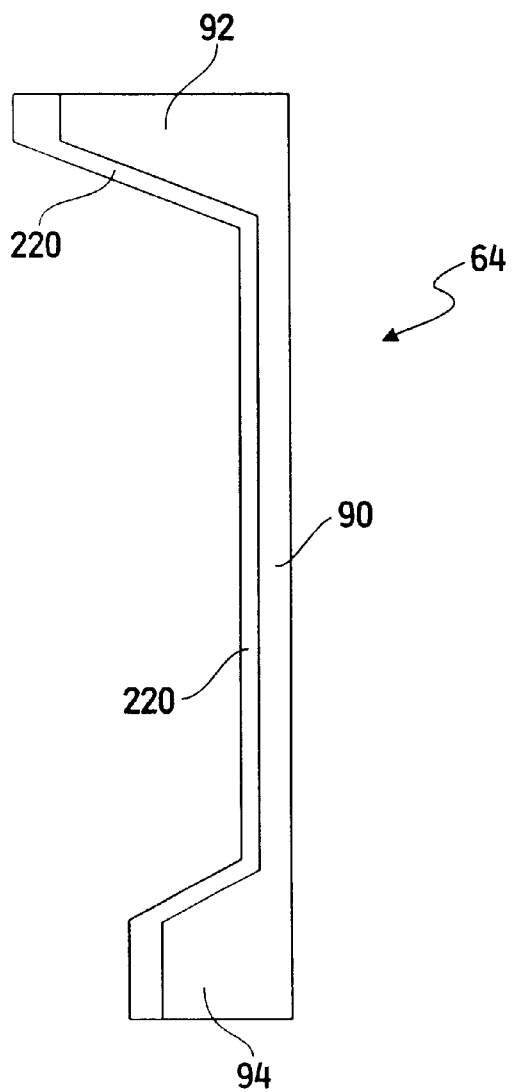
FIG. 9 is another side, elevational view of the cover plate of FIG. 6.
Figure 10:
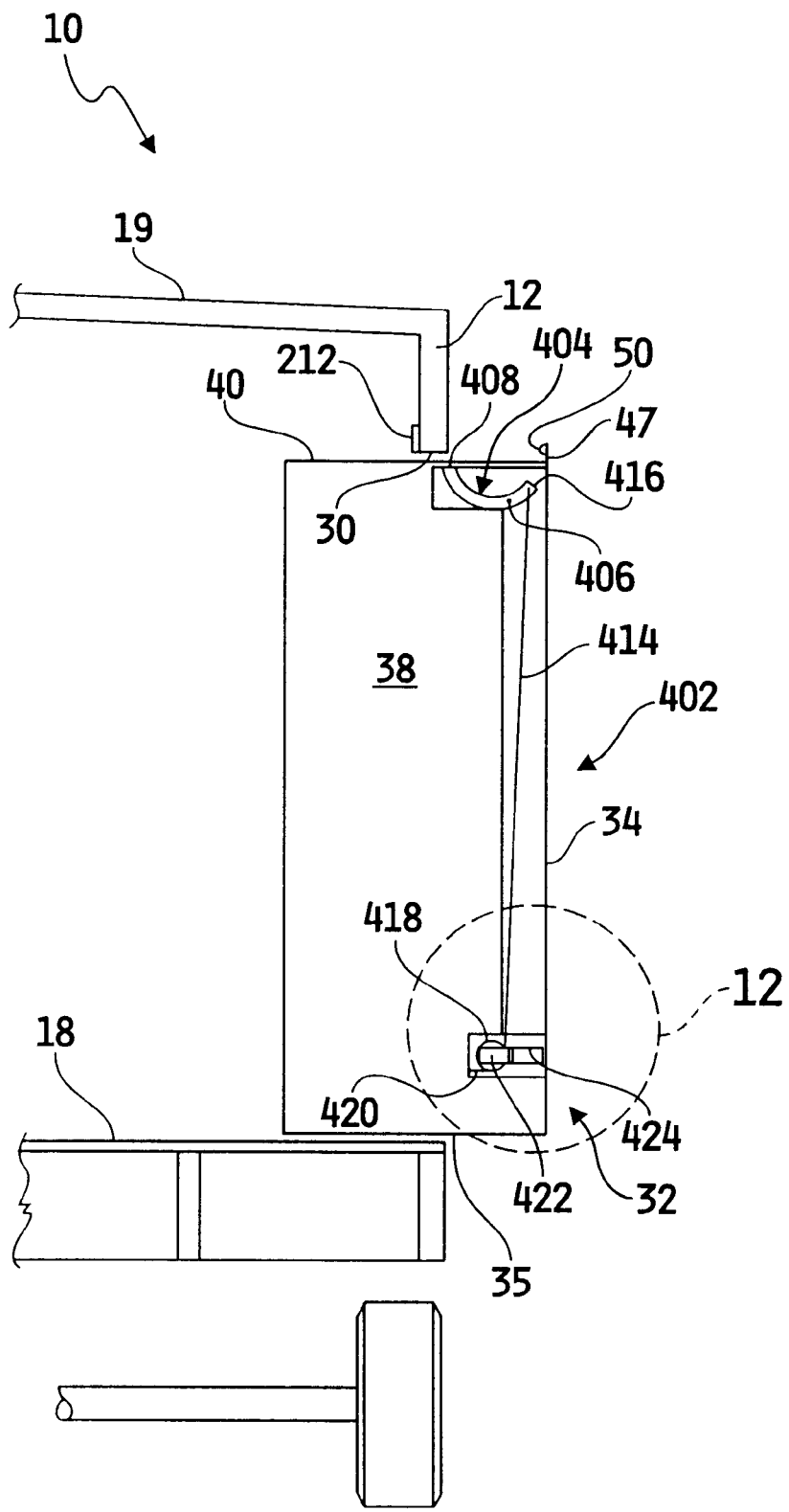
FIG. 10 is a fragmented, side elevational view of another embodiment of the latching mechanism according to the present invention mounted to a slide-out room in between the extended and retracted positions.

Latching mechanism 60 provides several advantages. Since mechanism 60 uses flat linkage members 66, 68, mechanism 60, complete with mounting plate 62, extends outwardly from side wall 38 of slide-out room 32 by only ⁵⁄₁₆th of an inch. Furthermore, the leading edge 220 (FIGS. 8 and 9) of cover plate 64 is tapered to prevent either scoring or tearing of wiper seal 51 which extends peripherally around opening 30. Additionally, upper linkage member 66 leads lower linkage member 68 such that linkage member 66 is well inside opening 30 prior to actuation of linkage member 68 to ensure that there is no unintended abutting of upper linkage members 66 with side wall 12 of unit 10. Furthermore, due to the geometry of linkage members 66, 68, particularly radii $R_1$ and $R_2$, an amplifying effect is created upon the rotation of lower linkage member 68 such that upper linkage member 66 rotates through a larger angular rotation than is input to lower linkage member 68. Latching mechanism 60 is easily retrofittable to existing rooms 32, since latching mechanism 60 is simply attached to side walls 36 and 38 and strike plates 200, 202 are simply attached to side wall 12 of unit 10. Also, due to the compensation link 160, latching mechanism 60 can accommodate various thicknesses of header of side wall 12 over opening 30 (FIGS. 3 and 4). While the thickness of the header for various manufacturers is generally within a somewhat narrow tolerance, the assembly requires some flexibility to accommodate differences. Spring 162 and the slack of cable 122 provided by kinked portion 164 provides the flexibility needed to accommodate a variety of thicknesses. Compensation link 160 also accommodates an over-stress situation where a strain relief is required for some reason.

Referring now to the embodiments of FIGS. 10–19, a latching mechanism generally indicated by the numeral 402 is mounted on each of the side walls 36, 38 of slide out room 32. Latching mechanisms 402 include a lever 404 which is mounted on side wall 38 adjacent ceiling 40. Lever 404 is mounted for movement relative to a fixed pivot 406 which mounts lever 404 onto side wall 38. Lever 404 is adapted to rotate about pivot 406 to move the end 408 of lever 404 to engage strike plate 212 mounted on wall 12 of main living quarters 10 to thereby latch slide out room 32 in place when slide out room 32 is moved into the retracted position. Latching mechanism 402 moves through gap 30 when room 32 is moved between the extended and retracted positions. As described above, gap 30 is covered by fascia 47 when room 32 is fully retracted.

Figure 12:
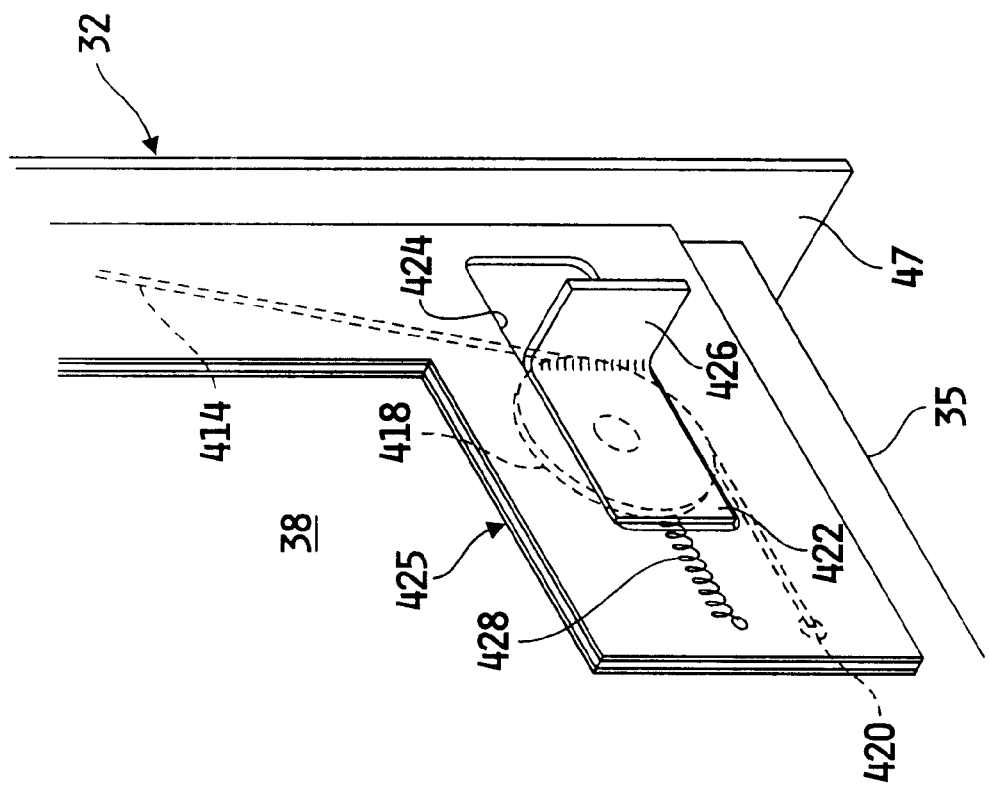
FIG. 12 is a fragmented, perspective view of a portion of the latching mechanism of FIG. 10 as illustrated in FIG. 10.
Figure 13:
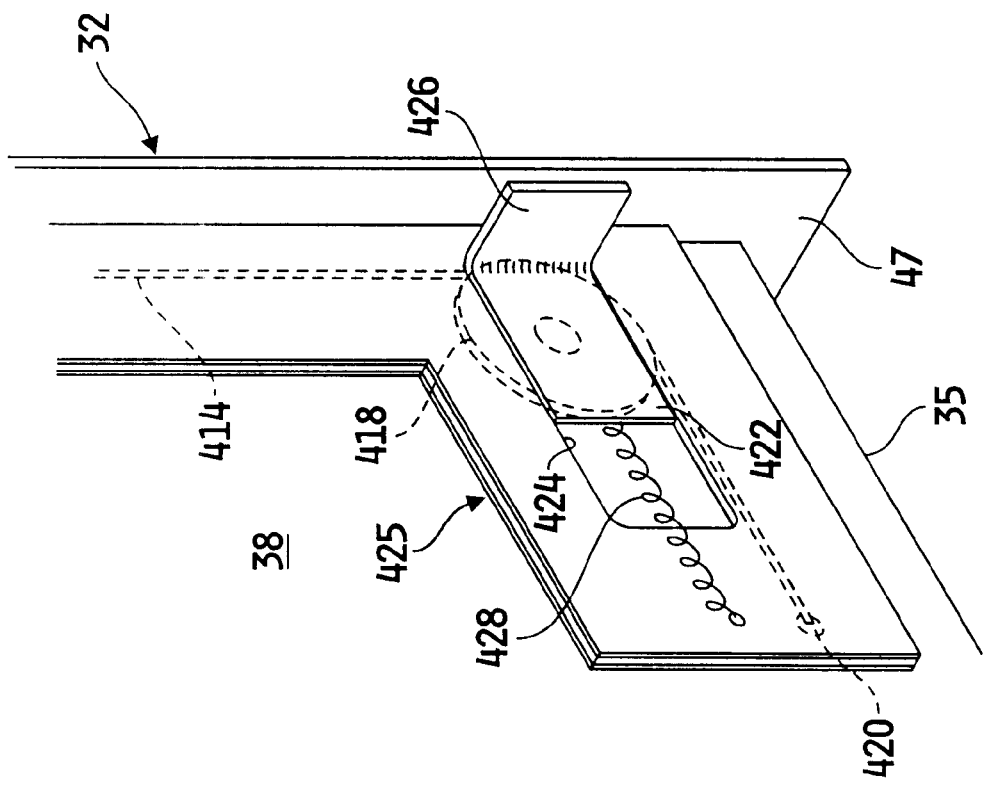
FIG. 13 is a view similar to FIG. 12.

A cable 414 is attached near pivot 406 adjacent the end 416 of lever 404 opposite end 408. As best shown in FIGS. 12 and 13, cable 414 extends downwardly from lever 404, wraps around a pulley 418, and is joined to side wall 38 at end 420. Pulley 418 is mounted on a carriage 422 which is guided for movement in a substantially horizontal direction by a slot 424 in bracket 425. A tab 426 projects outwardly from carriage 422 and side wall 38 so that tab 426 can engage a strike plate such as plate 210 of FIGS. 3 and 4 on side wall 12 adjacent opening 30. Of course, the latching mechanism 402 mounted on side wall 36 is symmetrical. A spring 428 yieldably urges carriage 422 toward the FIG. 12 position.

Figure 11:
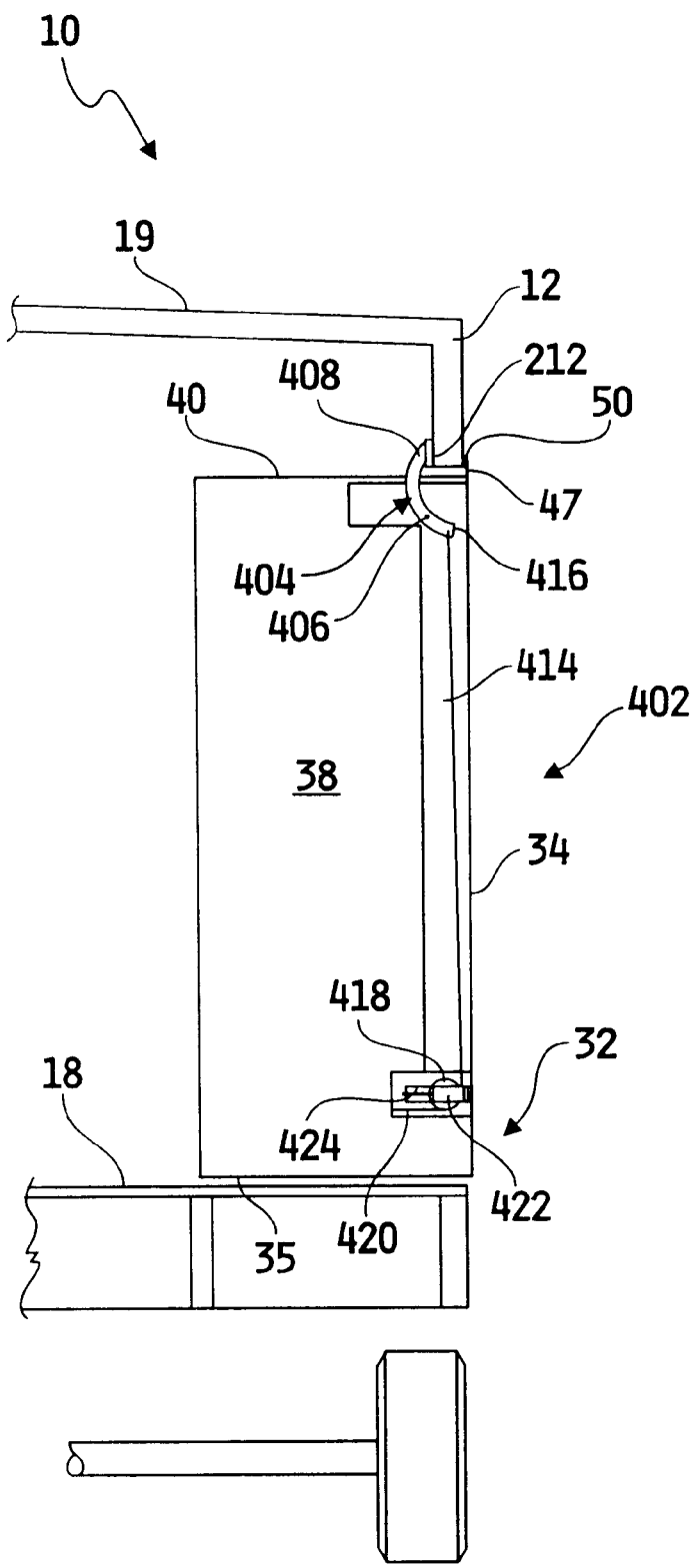
FIG. 11 is a view, similar to FIG. 10, showing the slide-out room in the retracted position.
Figure 18:
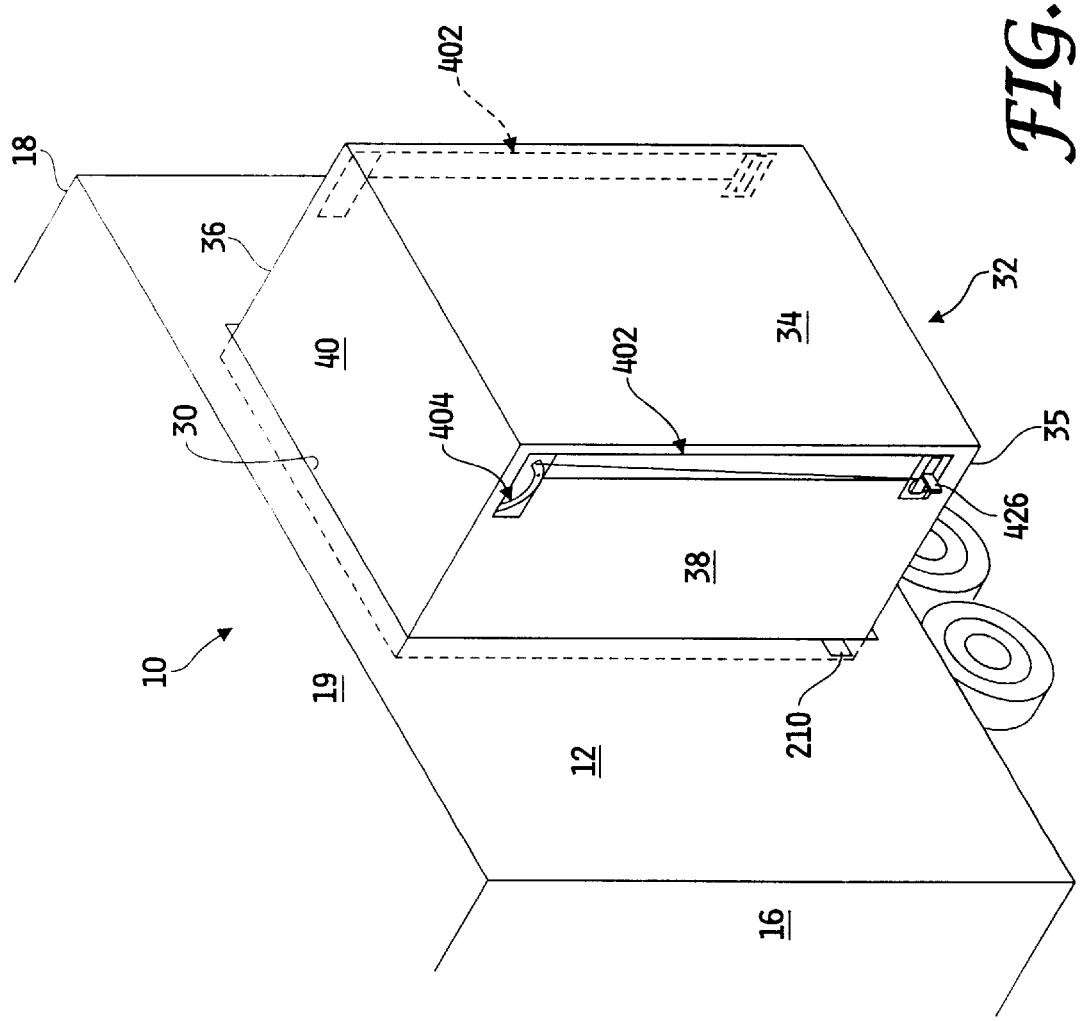
FIG. 18 is a fragmented, perspective view of a recreational vehicle having a slide-out room in the extended position, with a latching mechanism of FIGS. 10–13 attached thereto.
Figure 19:
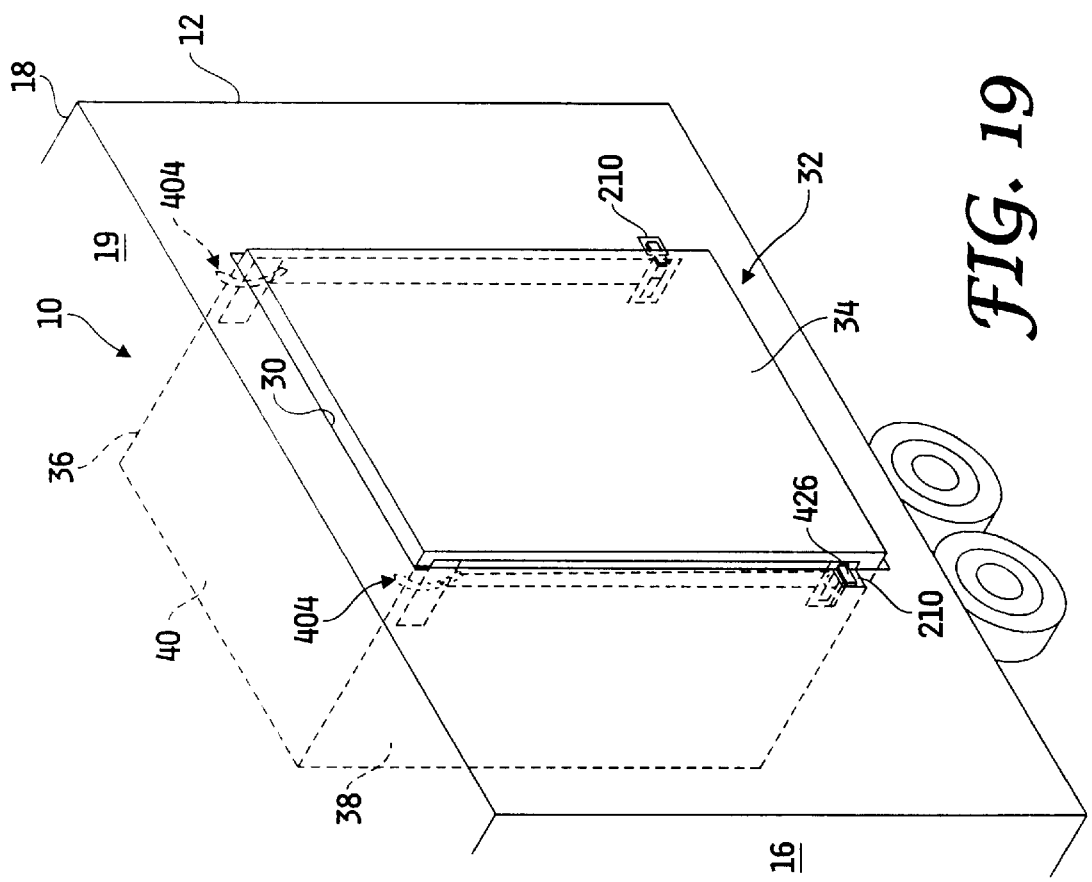
FIG. 19 is a view similar to FIG. 18 showing the slide-out room in the retracted position.

In operation, as slide out room 32 is moved from the extended position illustrated in FIG. 18 to the retracted position illustrated in FIGS. 11 and 19, tab 426 engages strike plate 210 on side wall 12 of main living quarters 10. Further inward movement of slide out room 32 causes tab 426 to move carriage 422, and therefore pulley 418, from the FIG. 12 position to the FIG. 13 position. As pulley 418 moves toward the FIG. 13 position, cable 414 is pulled downwardly by pulley 418, thereby rotating lever 404 about pivot 406 so that, as room 32 is moved into the retracted position, end 408 of lever 404 extends to engage strike plate 212, thereby locking slide out room 32 in the retracted position.

When room 32 is to be extended after vehicle 10 is parked, as described above, hydraulic rams (not shown), which are secured to slide out room 32 adjacent floor 35 thereof are operated. Accordingly, as room 32 is extended, movement of room 32 relative to side wall 12 forces lever 404 to pivot downwardly about pivot 406, this being allowed by slackening of cable 414 as tab 426 moves away from strike plate 210. Accordingly, initial movement of slide out room 32 away from the retracted position causes lever 404 to pivot downwardly into the position illustrated in FIG. 10, allowing it to pass beneath that portion of side wall 12 extending across ceiling 40 of slide out room 32.

Figure 14:
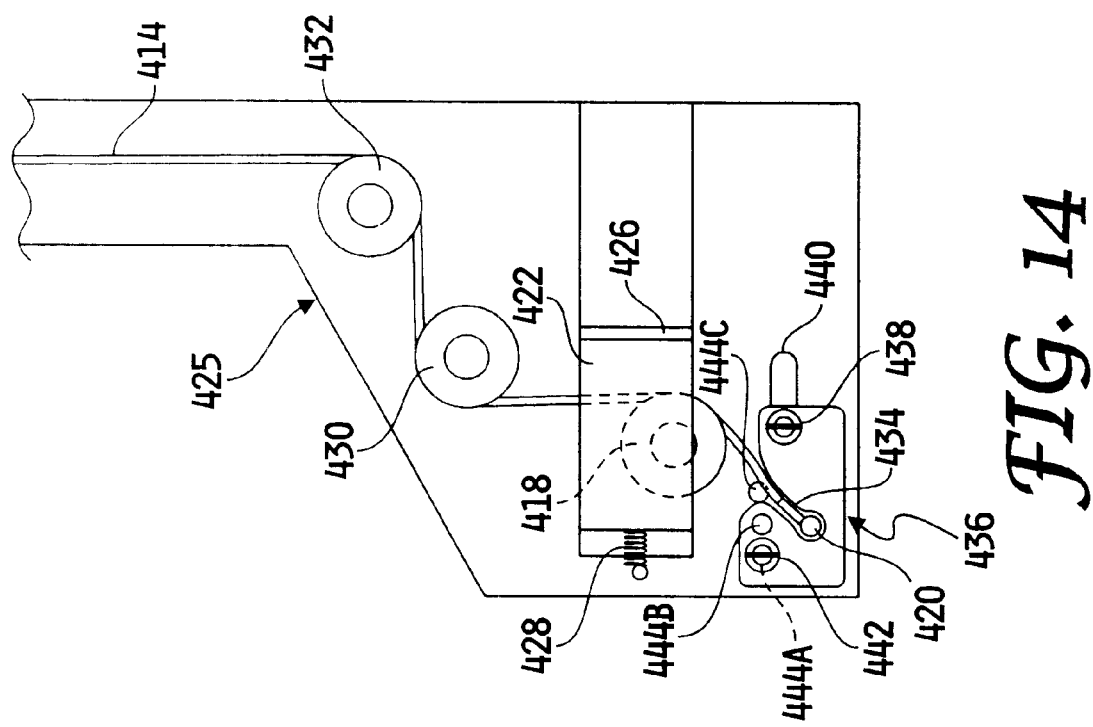
FIGS. 14 and 15 are fragmented, side elevational views of a portion of another embodiment of a latching mechanism according to the present invention.
Figure 15:
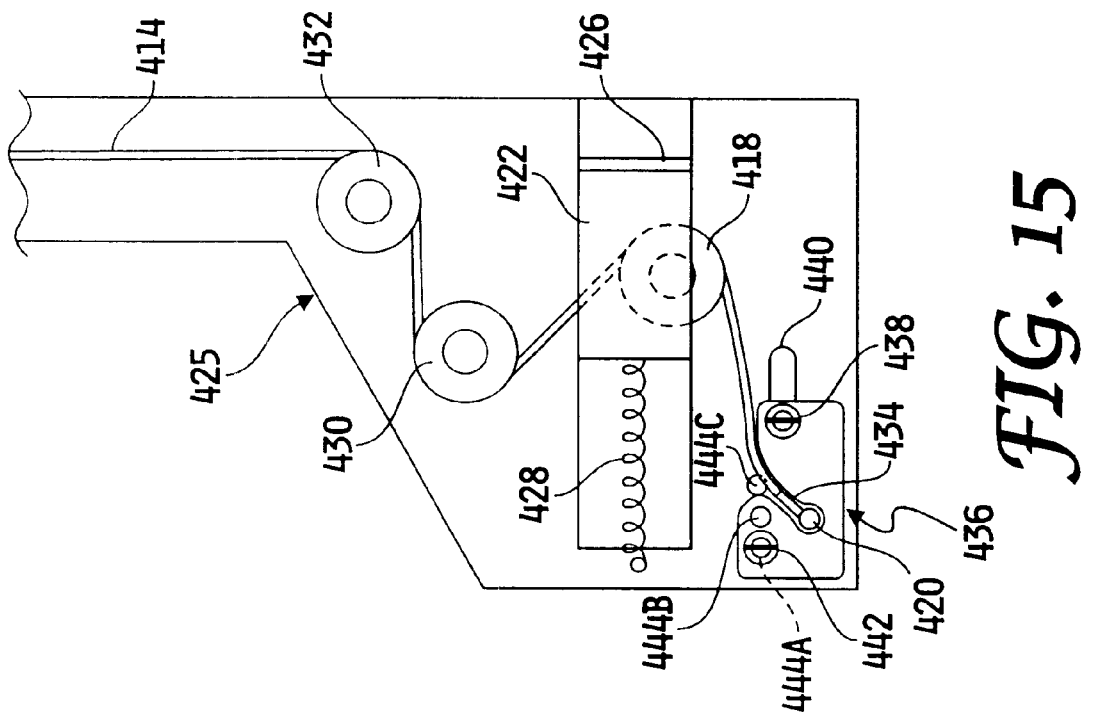

The embodiment of FIGS. 14 and 15 is similar to the embodiment of FIGS. 10–13 in that pulley 418 is mounted on carriage 422 which is moved from the FIG. 14 position to the FIG. 15 position by engagement of tab 426 with side wall 12 upon movement of slide out room 32 into the retracted position. Upon movement of slide out room 32 away from the retracted position, spring 428 returns carriage 422 to the position illustrated in FIG. 14 upon slackening of cable 414. In addition to pulley 418, cable 414 is wrapped around pulleys 430 and 432 to provide a force multiplier effect. The enlarged end 420 of cable 414 is received within a keyhole slot 434 in a fastening fixture 436 which is mounted on bracket 425 and is adjustable relative thereto with fastener 438 which is received in elongated slot 440 and another fastener 442 which may be secured in either of three collinear openings 444a, 444b or 444c. Accordingly, the effective length of cable 414 may be adjusted as necessary by loosening fastener 438, moving fixture 436, engaging fastener 442 into a different one of openings 444a, 444b, or 444c, and tightening fastener 438.

Figure 16:
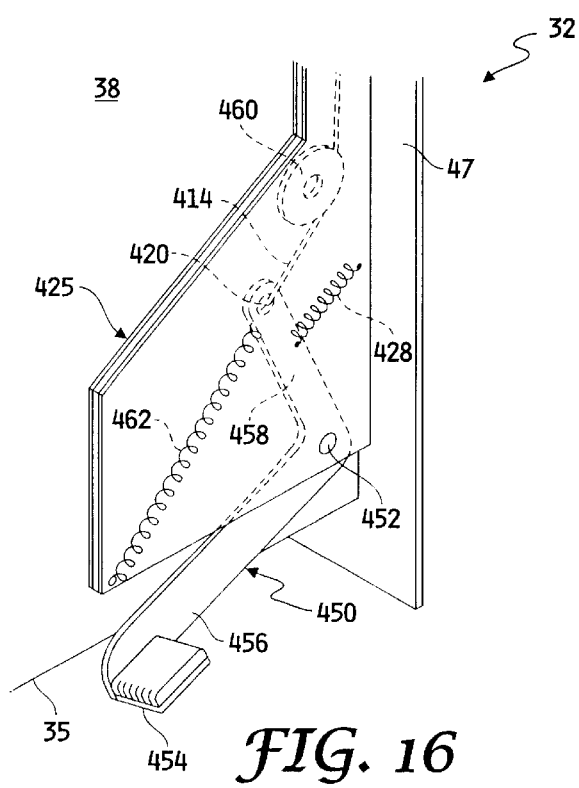
FIGS. 16 and 17 are perspective views of a portion of another embodiment of a latching mechanism according to the present invention.
Figure 17:
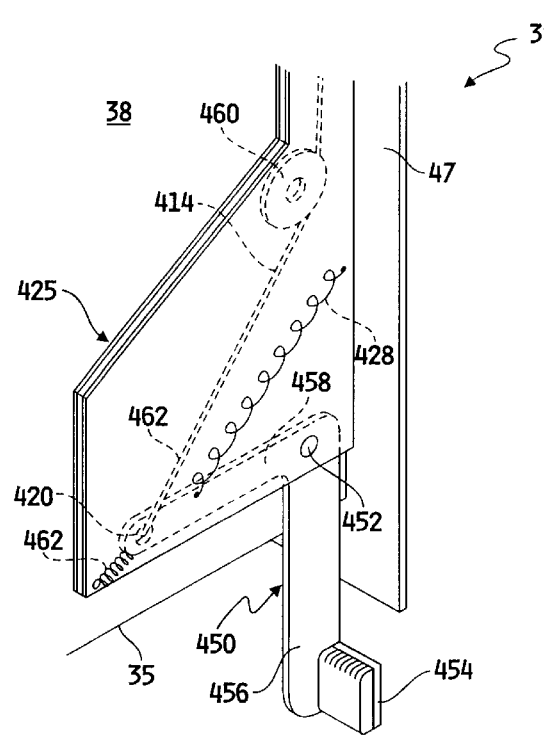

Referring now to the embodiment of FIGS. 16 and 17, a lever 450 is pivotably mounted on bracket 425 by a pivot connection 452. A tab 454 projects laterally from a downwardly extending arm 456 of lever 450, and enlarged end 420 of cable 414 is received in a slot (not shown) in another arm 458 of lever 450. Cable 414 is wrapped around pulley 460. A spring 462 biases lever 450 in a counter-clockwise direction about pivot connection 452 by engagement of tab 454 with the side wall 12. Rotation of lever 450 in the counter-clockwise direction from the FIG. 16 position toward the FIG. 17 position pulls cable 414 to operate lever 404 as described above. When slide out room 32 is moved away from the retracted position, cable 414 slackens, thereby permitting spring 428 to return lever 450 to the FIG. 16 position.

Figure 20:
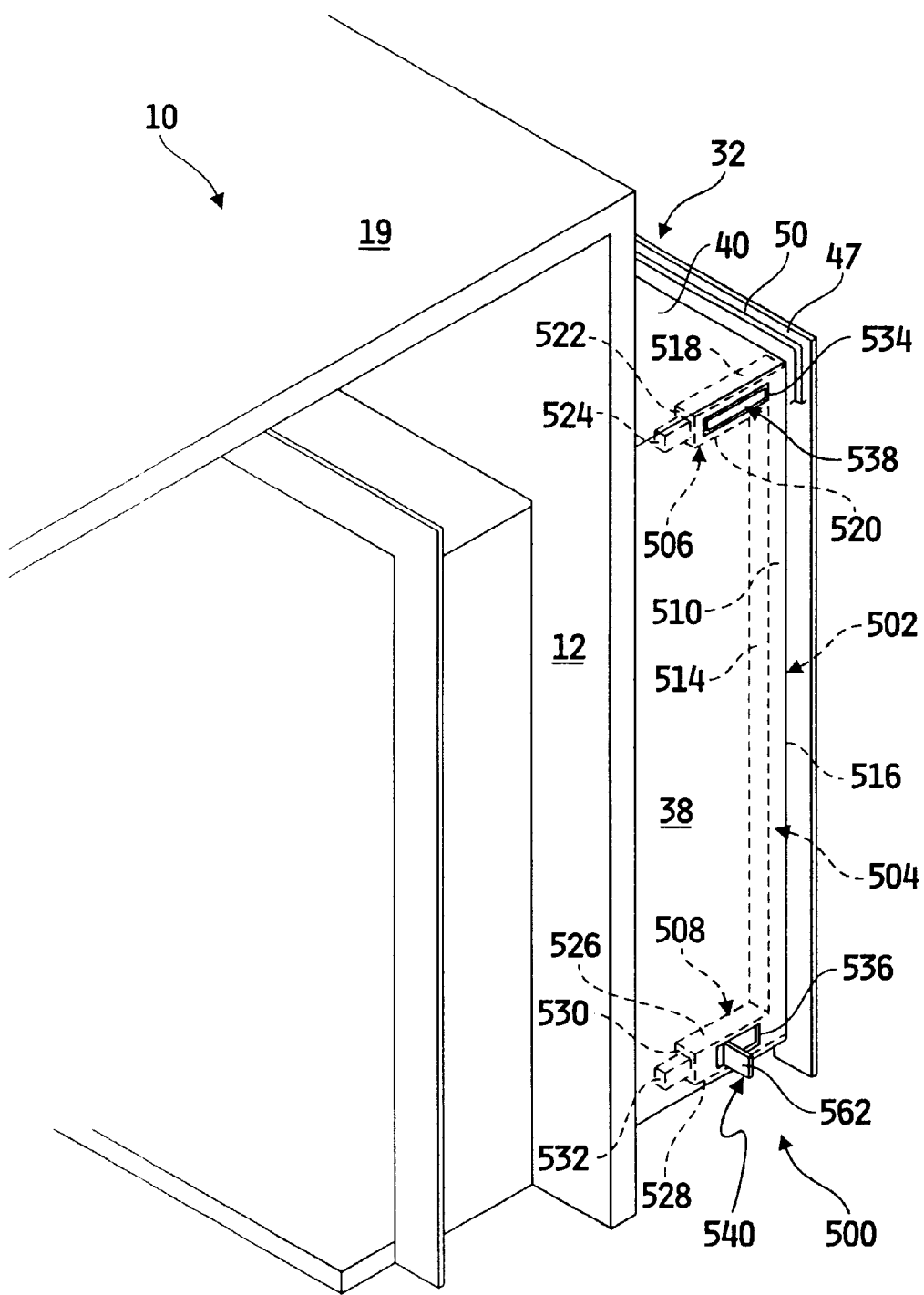
FIG. 20 is a fragmented, perspective view of a recreational vehicle having a slide-out room in between an extended and retracted position, with another embodiment of a latching mechanism according to the present invention.
Figure 21:
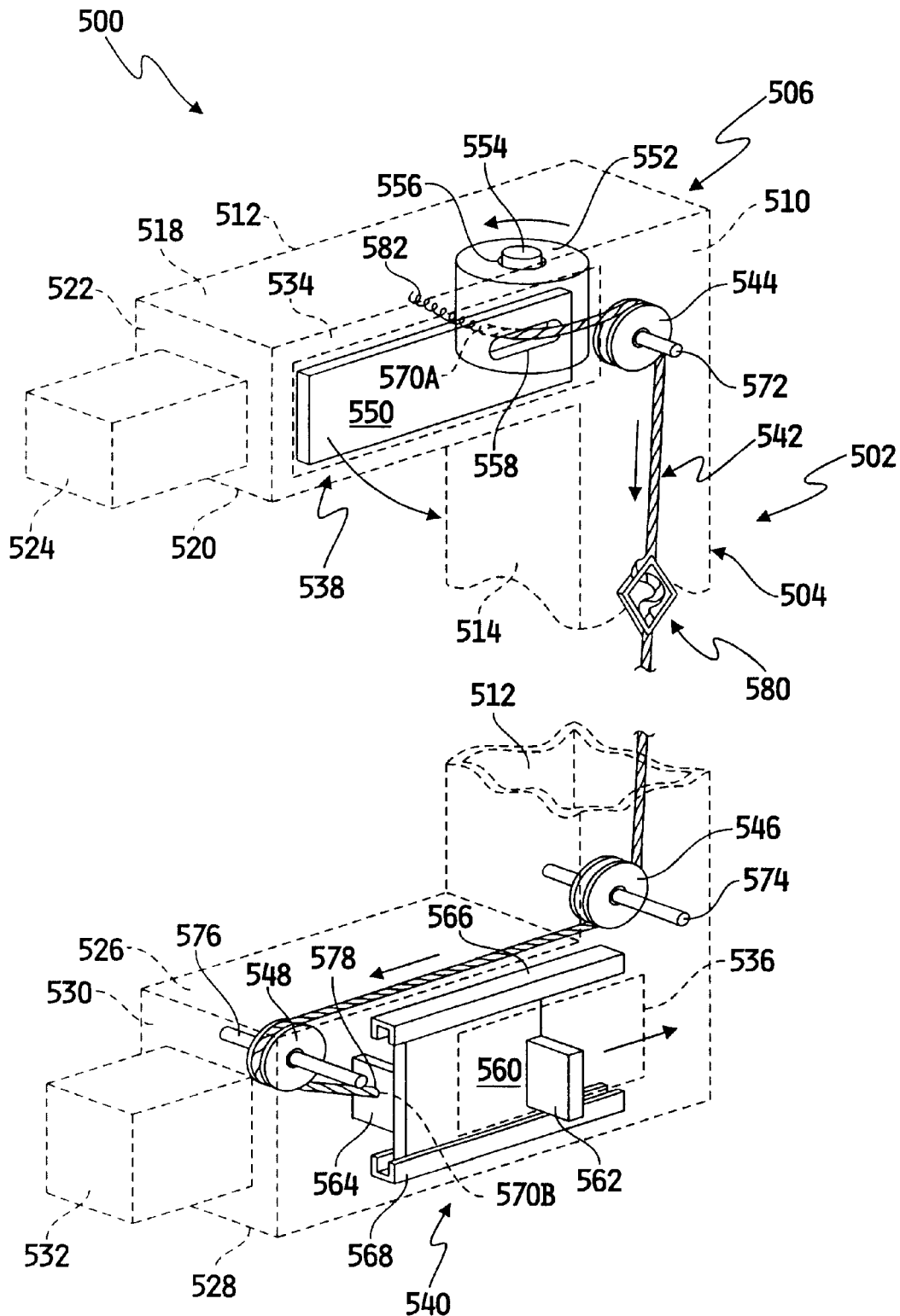
FIG. 21 is a fragmented, perspective view of the latching mechanism of FIG. 20.
Figure 22:
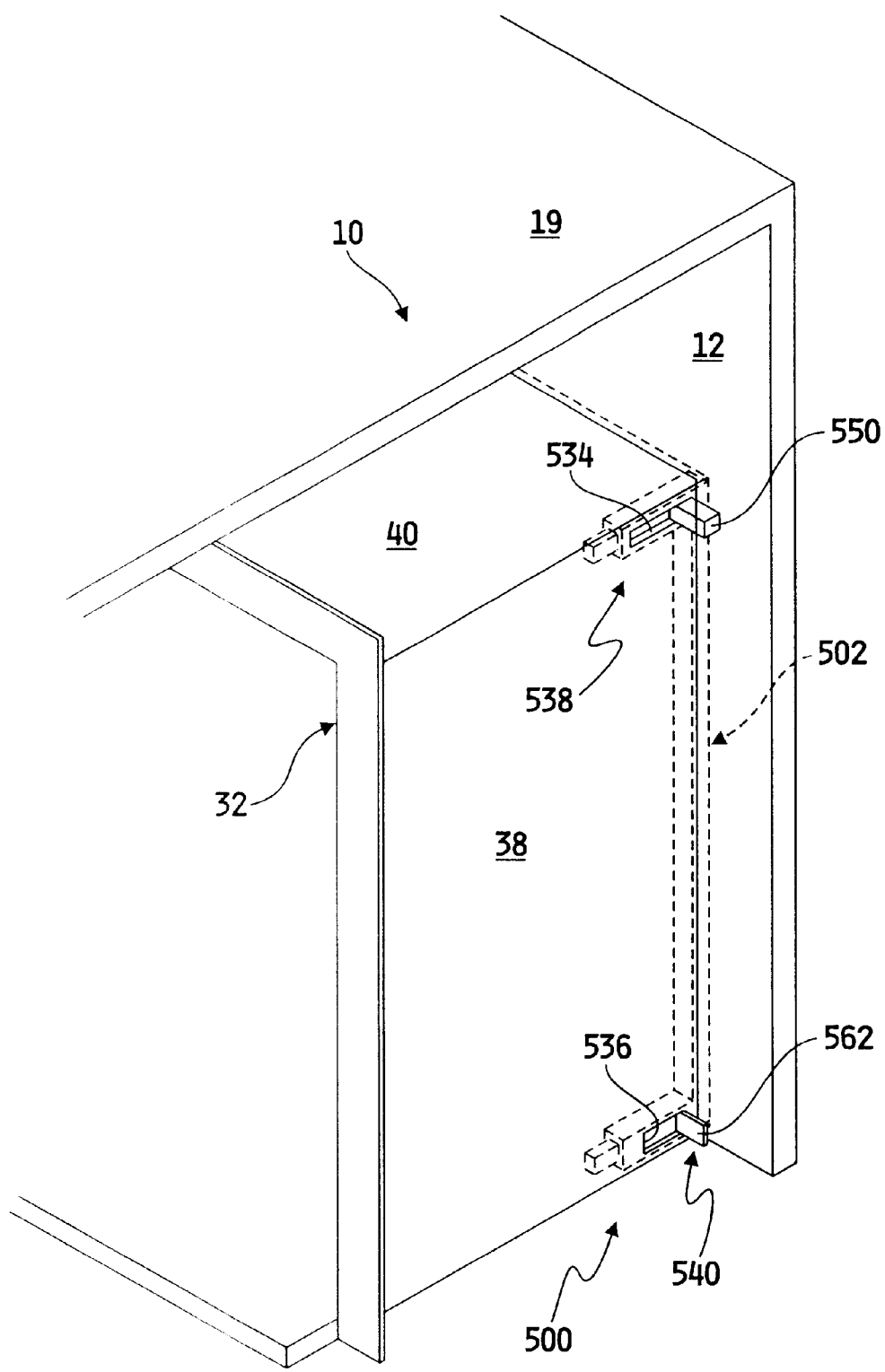
FIG. 22 is a fragmented, perspective view similar to FIG. 20, showing the slide-out room in the retracted position.

FIGS. 20–22 show another embodiment of a latching mechanism 500 according to the present invention. Latching mechanism 500 generally includes a housing 502 which is built into room 32 as part of the framework of the room. Housing 502 is shown in FIG. 20 as constituting part of the framework of side wall 38 of room 32. It should be understood that an identical latching mechanism 500 may constitute part of the framework of room side wall 36. Housing 502 generally includes a body 504, a latch housing 506, and an actuator housing 508. Each of these three components share side walls 510, 512. Body 504 further includes an inner wall 514 and an outer wall 516. Latch housing 506 includes an upper wall 518, a lower wall 520, and an end wall 522. A protrusion 524 extends from end wall 522 to mate with an adjacent frame member. Actuator housing 508 similarly includes an upper wall 526, a lower wall 528, and an end wall 530. A protrusion 532 extends from end wall 530 to mate with an adjacent frame member. Side wall 510 defines an opening 534 at latch housing 506 and an opening 536 at actuator housing 508. A latch 538 is mounted within latch housing 506, and an actuator 540 is mounted within actuator housing 508.

Referring now to FIG. 21, latching mechanism 500 further includes a link 542, a first pulley 544, a second pulley 546, and a third pulley 548. Latch 538 includes an engagement plate 550 which is connected to a barrel 552. Barrel 552 is mounted for rotation about a pin 554 which extends through an opening 556 formed in barrel 552 and is connected between latch box upper wall 518 and lower wall 520. Engagement plate 550 defines a slot 558 through which extends link 542 as will be further described below.

Actuator 540 includes a body 560 from which extends a first tab 562 and a second tab 564. Body 560 slides within a pair of opposing channels 566, 568 as will be further described below. Channel 566 is mounted to actuator housing upper wall 526 and channel 568 is mounted to actuator housing lower wall 528.

Link 542 has a first end 570A which extends through slot 558 and is connected to barrel 552. Link 542 extends around pulley 544 which is mounted for rotation on a rod 572 that extends between housing side walls 510, 512. Link 542 also extends around pulley 546 which is mounted for rotation about a rod 574 connected between housing side walls 510, 512, and pulley 548 which is mounted for rotation about rod 576 connected between housing side walls 510, 512. A second end 570B of link 542 is connected to second tab 564 through opening 578. Link 542 also includes a stress relief assembly or compensator 580 as is commonly known in the art.

As indicated in the drawings, as room 32 is moved from the extended position (FIG. 20) toward the retracted position (FIG. 22), first tab 562 of actuator 540 engages the exterior surface of vehicle side wall 12. When first tab 562 engages side wall 12, plate 550 of latch 538 is partially within vehicle 10. As room 32 is moved farther toward the retracted position, actuator body 560 slides within channels 566, 568 to the right as shown in FIG. 21. Accordingly, second tab 564 pulls link 542 about pulleys 548, 546, and 544. End 570A of link 542 pulls barrel 552 through counter-clockwise rotation about pin 554. Latch plate 550 is therefore rotated outwardly through opening 534 of latch housing 506 to engage the interior surface of vehicle side wall 12. Consequently, fascia 47 of room 32 is drawn tightly against vehicle side wall 12, thereby compressing seal 50 when room 32 is in the retracted position as shown in FIG. 22. When room 32 is moved from the retracted position, a return spring 582 which is connected between barrel 552 and housing side wall 512 causes counter-clockwise rotation of barrel 552. This rotation draws link 542 around barrel 552 and about pulleys 544, 546, 548, thereby moving actuator body 560 and first tab 562 back to the position shown in FIG. 21.

Although the present invention has been shown and described in detail, the same is to be taken by way of example only and not by way of limitation. Numerous changes can be made to the embodiments described above without departing from the scope of the invention. This application is therefore intended to cover any variations, uses, or adaptations of the invention using its general principles. Further, this application is intended to cover such departures from the present disclosure as come within known or customary practice in the art to which this invention pertains.

What is claimed is:

1. A latching mechanism for latching a vehicle slide out room to a side wall of the vehicle when the room is in a retracted position within the vehicle, and releasing the room as the room is moved through an opening in the vehicle side wall toward an extended position, the latching mechanism including:

an upper linkage member pivotally connected to a side wall of the room for movement between a latched position and an unlatched position, the upper linkage member including a force transmitting portion;

a lower linkage member pivotally connected to the room side wall, the lower linkage member including an actuation portion for engaging the vehicle side wall as the room is moved into the retracted position, the lower linkage member pivoting in response to engagement of the actuation portion with the vehicle side wall;

a first cable extending between the upper linkage member and the lower linkage member; and a spring connected between the room side wall and the upper linkage member, the spring applying a biasing force to bias the upper linkage member toward the unlatched position;

wherein as the lower linkage member pivots, the first cable causes the upper linkage member to pivot against the biasing force of the spring toward the latched position such that the force transmitting portion engages the vehicle side wall to latch the room in the retracted position.

2. The latching mechanism of claim 1 wherein one of the upper linkage member and the lower linkage member pivots in a clockwise direction and the other of the upper linkage member and the lower linkage member pivots in a counter-clockwise direction.

3. The latching mechanism of claim 1 further including a second cable connected between the spring and the upper linkage member.

4. The latching mechanism of claim 3 further including a first roller, a second roller, and a third roller, the first cable engaging the first roller, and the second cable engaging the second and third rollers.

5. The latching mechanism of claim 1 wherein the upper and lower linkage members are mounted to the room side wall such that the force transmitting portion moves through the opening before the actuation portion engages the vehicle side wall.

6. The latching mechanism of claim 1 wherein the lower linkage member pivots about a first pivot pin, the first cable being connected to the lower linkage member at a location corresponding to a first radius relative to the first pivot pin, and the upper linkage member pivots about a second pivot pin, the first cable being connected to the upper linkage member at a location corresponding to a second radius relative to the second pivot pin, the second radius being greater than the first radius.

7. The latching mechanism of claim 1 wherein the first cable includes a compensation link having a spring for yielding when the lower linkage member pivots after the force transmitting portion of the upper linkage portion has engaged the vehicle side wall.

8. The latching mechanism of claim 1 further including a cover plate, the upper and lower linkage members, the first cable, and the spring being connected to the cover plate.

9. The latching mechanism of claim 8 wherein the cover plate includes side margins which form receiving channels, the latching mechanism further including a pair of retaining plates connected to the cover plate for substantially enclosing the upper and lower linkage members, the first cable, and the spring within the cover plate.

10. The latching mechanism of claim 9 wherein the coverplate includes an upper foot portion, a lower foot portion, and a channel portion extending between the upper foot portion and the lower foot portion, one of the retaining plates being received within the receiving channels through the upper foot portion, the other of the retaining plates being received within the receiving channels through the lower foot portion.

11. The latching mechanism of claim 9 further including a mounting plate mounted to the room side wall, the mounting plate having a plurality of pins, the retaining plates having a plurality of apertures aligned with the mounting plate pins for connecting the retaining plates and the cover plate to the mounting plate.

12. The latching mechanism of claim 8 further including a mounting plate mounted to the room side wall, the cover plate being attached to the mounting plate.

13. The latching mechanism of claim 8 wherein the upper linkage member is substantially enclosed within the cover plate when in the unlatched position, the force transmitting portion protruding from the cover plate when the upper linkage member is in the latched position.

14. A latching mechanism for latching a vehicle slide out room to a side wall of the vehicle when the room is in a retracted position within the vehicle, and releasing the room as the room is moved through an opening in the vehicle side wall toward an extended position, the latching mechanism including:

a mounting plate connected to a side wall of the room;

a cover plate connected to the mounting plate, the cover plate having an upper portion and a lower portion, the mounting plate and the upper portion forming an upper opening, the mounting plate and the lower portion forming a lower opening; and a linkage disposed substantially between the mounting plate and the cover plate, the linkage having a lower member extending through the lower opening to engage the vehicle side wall and pivot as the room is moved into the retracted position, and an upper member connected to the lower member, the upper member extending through the upper slot and engaging the vehicle side wall to latch the room to the vehicle in response to the pivoting of the lower member.

15. The latching mechanism of claim 14 wherein the linkage includes a first cable extending between the upper member and the lower member.

16. The latching mechanism of claim 15 wherein the linkage includes a spring connected between the cover plate and the upper member, the spring applying a biasing force to bias the upper member against extending through the upper slot.

17. The latching mechanism of claim 14 wherein one of the upper member and the lower member pivots in a clockwise direction and the other of the upper member and the lower member pivots in a counter-clockwise direction.

18. The latching mechanism of claim 16 further including a second cable connected between the spring and the upper member.

19. The latching mechanism of claim 18 wherein the cover plate includes a first roller, a second roller, and a third roller, the first cable engaging the first roller, and the second cable engaging the second and third rollers.

20. The latching mechanism of claim 14 wherein the upper and lower members are mounted to the cover plate such that a portion of the upper member moves through the vehicle side wall opening before the lower member engages the vehicle side wall.

21. The latching mechanism of claim 15 wherein the lower member pivots about a first pivot pin, the first cable being connected to the lower member at a location corresponding to a first radius relative to the first pivot pin, and the upper member pivots about a second pivot pin, the first cable being connected to the upper member at a location corresponding to a second radius relative to the second pivot pin, the second radius being greater than the first radius.

22. The latching mechanism of claim 15 wherein the first cable includes a compensation link having a spring for yielding when the lower member pivots after the upper member has engaged the vehicle side wall.

23. The latching mechanism of claim 14 wherein the cover plate includes side margins which form receiving channels, the latching mechanism further including a pair of retaining plates connected to the cover plate for substantially enclosing the upper and lower members within the cover plate, the retaining plates being disposed between the mounting plate and the cover plate.

24. The latching mechanism of claim 23 wherein the cover plate includes an upper foot portion, a lower foot portion, and a channel portion extending between the upper foot portion and the lower foot portion, one of the retaining plates being received within the receiving channels through the upper foot portion, the other of the retaining plates being received within the receiving channels through the lower foot portion.

25. The latching mechanism of claim 23 wherein the mounting plate includes a plurality of pins, the retaining plates having a plurality of apertures aligned with the mounting plate pins for connecting the retaining plates and the cover plate to the mounting plate.

26. A latching mechanism for latching a slide out room to a side wall of a vehicle when the room is in a retracted position within the vehicle, and releasing the room as the room is moved through an opening in the vehicle side wall toward an extended position, the latching mechanism including:
 a lever having a first end for engaging the vehicle side wall, a second end, and a pivot connection to a side wall of the room between the first and second ends;
 a carriage connected to the room side wall for substantially horizontal movement toward and away from a back wall of the room, the carriage including a tab which extends perpendicularly from the room side wall to engage the vehicle side wall as the room approaches the retracted position, and a first pulley; and
 a cable having a first end connected to the second end of the lever, and a second end connected to the room side wall, the cable extending partially around the first pulley;
 wherein further movement of the room toward the retracted position after the tab engages the vehicle side wall moves the carriage and the first pulley horizontally toward the room back wall, thereby moving the cable first end and the lever second end such that the lever first end pivots into engagement with the vehicle side wall to latch the room in the retracted position.

27. The latching mechanism of claim 26 further including a spring connected between the room side wall and the carriage, the spring biasing the carriage away from the room back wall.

28. The latching mechanism of claim 26 wherein the lever is mounted adjacent an upper portion of the room and the carriage is mounted adjacent a lower portion of the room.

29. The latching mechanism of claim 26 further including a bracket mounted to the room side wall including a slot, the carriage being mounted to the bracket such that the tab extends through the slot, the first pulley being substantially enclosed within the bracket.

30. The latching mechanism of claim 26 wherein the lever and the carriage are connected to the room side wall such that the first end of the lever passes through the vehicle side wall opening before the tab engages the vehicle side wall as the room is moved into the retracted position.

31. The latching mechanism of claim 26 wherein the lever first end engages the vehicle side wall adjacent an upper edge of the side wall opening.

32. The latching mechanism of claim 26 further including a second pulley connected to the room side wall and a third pulley connected to the room side wall, the cable extending partially around the second and the third pulleys.

33. The latching mechanism of claim 26 further including an adjustable fixture connected to the room side wall, the second end of the cable being connected to the adjustable fixture.

34. The latching mechanism of claim 33 wherein the adjustable fixture is adjustable horizontally toward and away from the room back wall to increase or decrease the effective length of the cable.

35. A latching mechanism for latching a slide out room to a side wall of a vehicle when the room is in a retracted position within the vehicle, and releasing the room as the room is moved through an opening in the vehicle side wall toward an extended position, the latching mechanism including:
 a first lever having a first end for engaging the vehicle side wall, a second end, and a pivot connection to a side wall of the room between the first and second ends;
 a second lever pivotally connected to the room side wall having a first arm, a tab extending from the first arm for engaging the vehicle side wall, and a second arm; and
 a cable having a first end connected to the second end of the first lever, and a second end connected to the second arm of the second lever;
 wherein the tab engages the vehicle side wall and the second lever pivots as the room is moved into the retracted position such that the second lever second arm pulls the cable away from the first lever, the first lever pivoting in response thereto such that the lever first end pivots into engagement with the vehicle side wall to latch the room in the retracted position.

36. The latching mechanism of claim 35 further including a spring connected between the room side wall and the second lever, the spring biasing the second arm of the second lever toward the first lever.

37. The latching mechanism of claim 35 wherein the first lever is mounted adjacent an upper portion of the room and the second lever is mounted adjacent a lower portion of the room.

38. The latching mechanism of claim 35 further including a pulley connected to the room side wall, the cable extending partially around the pulley.

39. The latching mechanism of claim 35 wherein the first lever and the second lever are connected to the room side wall such that the first end of the first lever passes through the vehicle side wall opening before the tab engages the vehicle side wall as the room is moved into the retracted position.

40. The latching mechanism of claim 35 wherein the first end of the first lever engages the vehicle side wall adjacent an upper edge of the vehicle side wall opening.

41. The latching mechanism of claim 35 wherein the second lever first arm is substantially perpendicular to the second lever second arm.

42. A latching mechanism for latching a slide out room to a side wall of a vehicle when the room is in a retracted position within the vehicle, and releasing the room as the room is moved through an opening in the vehicle side wall toward an extended position, the latching mechanism including:

a latch connected to the room having an engagement plate for engaging the vehicle side wall to latch the room in the retracted position;

an actuator connected to the room for substantially horizontal movement toward and away from a back wall of the room, the actuator including a tab which extends perpendicularly from the room to engage the vehicle side wall as the room approaches the retracted position; and a link extending between the latch and the actuator;

wherein further movement of the room toward the retracted position after the tab engages the vehicle side wall moves the actuator toward the room back wall, thereby moving the link such that the link causes the engagement plate to pivot outwardly into engagement with the vehicle side wall, thereby latching the room in the retracted position.

43. The latching mechanism of claim 42 further including a housing enclosing the latch, the actuator and the link, the housing being a component of a framework of a side wall of the room.

44. The latching mechanism of claim 42 wherein the latch includes a barrel pivotally connected to a side wall of the room, the engagement plate being connected to the barrel to pivot between a first position substantially parallel to the room side wall, and a second position substantially perpendicular to the room side wall wherein the engagement plate engages the vehicle side wall.

45. The latching mechanism of claim 42 further including a first pulley connected to the vehicle side wall adjacent the latch, a second pulley connected to the vehicle side wall adjacent the actuator, and a third pulley connected to the vehicle side wall adjacent the actuator, the link extending partially around each of the first, second, and third pulleys.

46. The latching mechanism of claim 42 wherein the link is a cable.

47. The latching mechanism of claim 43 wherein the housing includes a first opening and a second opening, the engagement plate extending through the first opening to engage the vehicle side wall, the actuator tab extending through the second opening to engage the vehicle side wall.

48. The latching mechanism of claim 43 wherein the actuator includes a body, the tab being connected to the body, the body being movable substantially horizontally toward and away from the room back wall in a pair of channels connected to the housing.

49. The latching mechanism of claim 42 further including a spring connected between a side wall of the room and the latch, the spring biasing the latch toward an unlatched position.

50. The latching mechanism of claim 42 wherein the latch is mounted adjacent an upper portion of the room and the actuator is mounted adjacent a lower portion of the room.

51. The latching mechanism of claim 42 wherein the latch and the actuator are connected to a side wall of the room such that a portion of the engagement plate passes through the vehicle side wall opening before the tab engages the vehicle side wall as the room is moved into the retracted position.

52. The latching mechanism of claim 42 wherein the engagement plate engages the vehicle side wall adjacent an vertical edge of the side wall opening.

* * * * *